United States Patent [19]

Wells

[11] 4,008,996
[45] Feb. 22, 1977

[54] MULTIPLE TIER OVEN

[75] Inventor: Harold D. Wells, St. Louis County, Mo.

[73] Assignee: Black Body Corporation, Fenton, Mo.

[22] Filed: May 6, 1975

[21] Appl. No.: 574,926

[52] U.S. Cl. .................... 432/128; 126/19 R; 126/21 R; 219/400; 432/132

[51] Int. Cl.² ........................... F27B 13/02

[58] Field of Search ........... 126/19 R, 21 R, 21 A, 126/273 R; 99/360, 373, 443; 432/128, 132, 131, 240, 239; 219/400

[56] References Cited

UNITED STATES PATENTS

| | | | |
|---|---|---|---|
| 2,471,566 | 5/1949 | Groetchen | 126/19 R |
| 2,683,795 | 7/1954 | Sheidler et al. | 126/19 R |
| 2,978,237 | 4/1961 | Frank | 432/128 |
| 3,492,938 | 2/1970 | Oxford et al. | 99/443 R |
| 3,548,153 | 12/1970 | Kells | 219/400 |
| 3,802,832 | 4/1974 | Nicolaus | 432/128 |

*Primary Examiner*—Edward G. Favors
*Attorney, Agent, or Firm*—Ralph W. Kalish

[57] ABSTRACT

A multiple tier oven which comprises a plurality of superimposed oven chambers, each being of tunnel character having an ingress at one end and an egress at the opposite end; each oven being heated at its top and bottom, and individually controllable heating means for each oven to allow of preselected temperature differentials. Associated with each oven chamber and surfacewise aligned with the floor thereof is a service deck for introduction of articles or products to be heated, such as, for example, food, into the related oven chamber and for receipt of heated articles from the egress end thereof. Endless conveyor means are associated with each deck and having a preselected number of sweep arms engageable thereon for directing articles into, through, and from each oven chamber.

23 Claims, 27 Drawing Figures

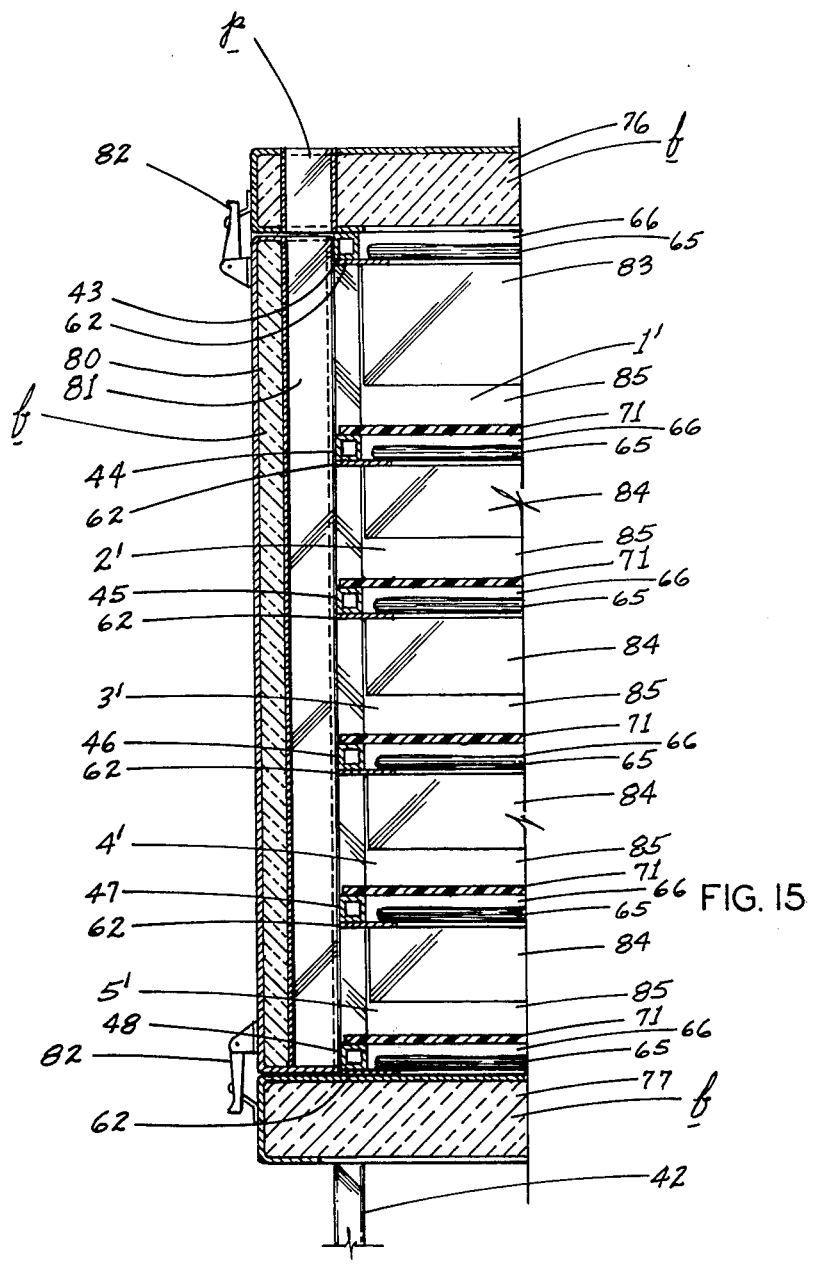
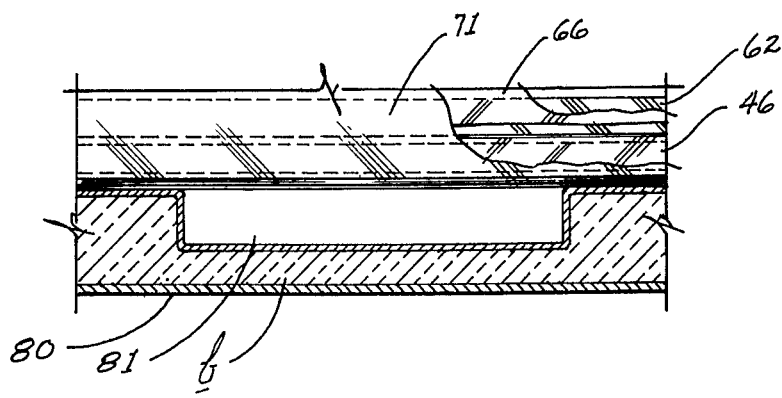
FIG. 15
FIG. 14

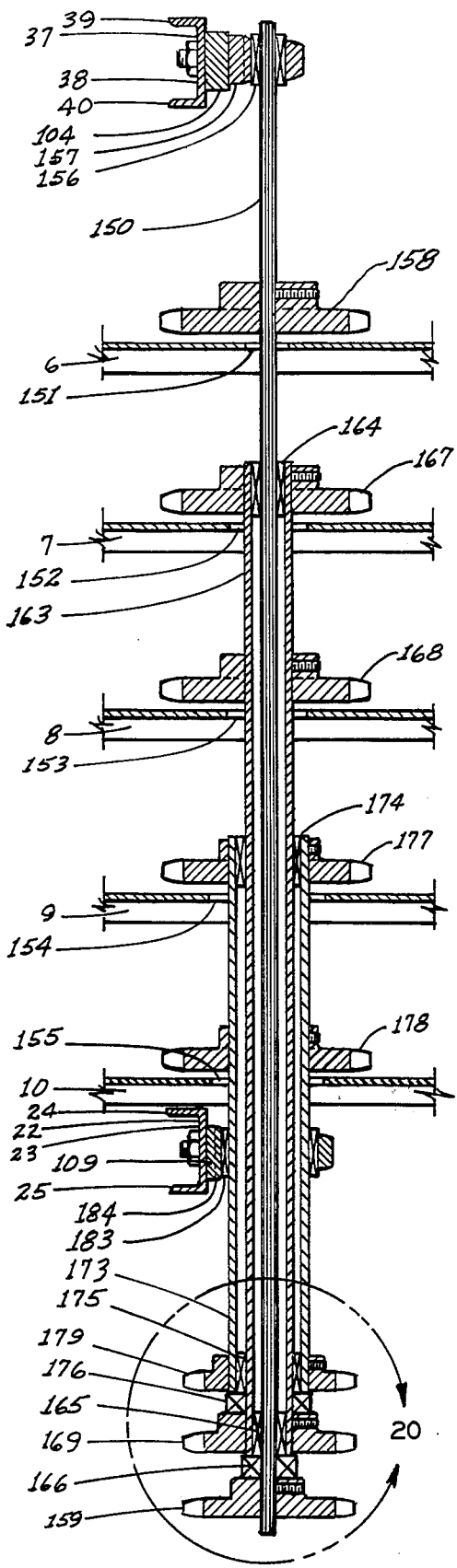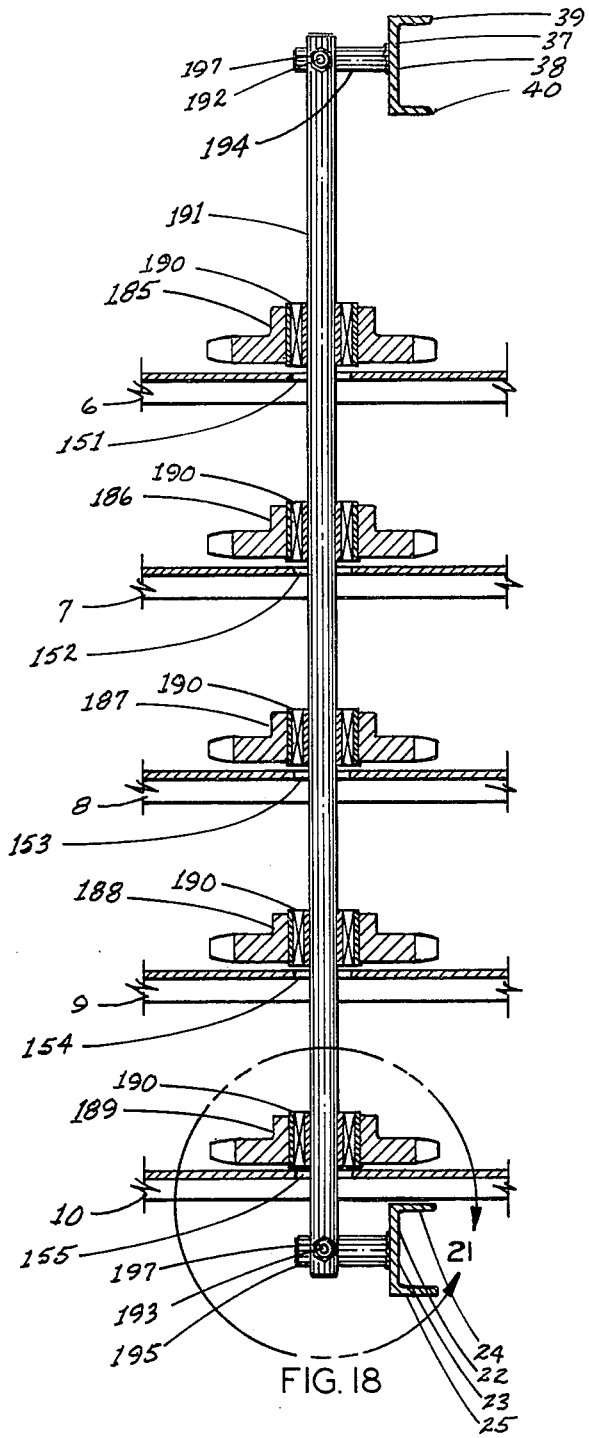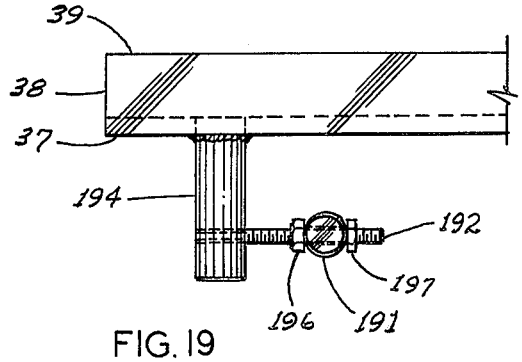
FIG. 17
FIG. 18
FIG. 19

FIG. 25

FIG. 26
230VAC, THREE PHASE

FIG. 27
230VAC, SINGLE PHASE

MULTIPLE TIER OVEN

BACKGROUND AND SUMMARY OF THE INVENTION

This invention relates in general to heating apparatus and, more particularly, to an oven having a plurality of discrete, superimposed chambers with associated serving and loading decks.

Heretofore conventional ovens have consistently comprised a single, enlarged chamber having a plurality of superimposed, vertically spaced-apart supports of the open-work type since such ovens have customarily relied upon convection for heating. Openwork supports have thus been required to permit heated air to reach the upper zone of the oven and in view of the height of the oven an uneven heat distribution developes whereby appropriate heat control cannot be achieved with respect to any one level with uniform heat intensity, and thus incomplete heating of the various articles or items results. Also, such ovens, besides the aforesaid deficiency, have not been designed for cooperation with conveying means to permit heating in a rapid manner so as to accommodate substantial quantities in limited time and within limited floor area.

Therefore, it is an object of the present invention to provide an oven having a multiplicity of superimposed discrete heating chambers each of which is provided with a top and bottom heat source and with individual control means therefor so that each chamber may be operated at a predetermined temperature.

It is another object of the present invention to provide an oven of the character stated which comprises a serving deck associated with each oven chamber for receiving products to be heated and for removal of heated products, and which provides a surface continuous with the related oven chamber floor.

It is a further object of the present invention to provide an oven of the type stated which embodies a novel conveyor unit with each associated serving deck and oven chamber whereby products to be heated may be presented in its customary tray or pan for direction into, and delivery from, the associated oven chamber; said chambers thus being of tunnel type.

It is another object of the present invention to provide a multiple tier oven of the type stated which incorporates article delivery control means so that the duration of exposure to heat of articles within each oven chamber may be controlled.

It is another object of the present invention to provide a multiple tier oven which permits of fast food service in a reliable manner for rapidly accommodating substantial serving requirements and which permits of the preparation of a variety of foods simultaneously by reason of the independency of each oven chamber.

It is a further object of the present invention to provide an oven of the character stated which is uniquely designed to permit ready access to the oven for cleaning purposes and which provides equally facile access for inspection and repair of heating units and the like.

It is a still further object of the present invention to provide a multiple tier oven of the type stated which has widespread usage in institutional, industrial, and commercial purposes; which is comprised of a simplicity of sturdy components conducing to longevity of usage and reliability; which may be produced economically; and which is of such simplicity in operation that it would not require the services of a skilled individual.

BRIEF DESCRIPTION OF THE DRAWINGS

FIG. 14 is a horizontal transverse sectional view taken on the line 14—14 of FIG. 3.

FIG. 15 is a vertical transverse sectional view taken on the line 15—15 of FIG. 3.

FIG. 17 is a vertical transverse sectional view taken on the line 17—17 of FIG. 16, but omitting the conveyors for purposes of clarity.

FIG. 18 is a vertical transverse sectional view taken on the line 18—18 of FIG. 16, but omitting the conveyors for purposes of clarity.

FIG. 19 is a top plan view taken on the line 19—19 of FIG. 16.

FIG. 25 is a wiring diagram.

FIG. 26 is a partial diagram illustrating the wiring for one arrangement of the terminal block.

FIG. 27 is a partial diagram illustrating another form of wiring arrangement for the terminal block.

DESCRIPTION OF THE PREFERRED EMBODIMENT

Figure 1:
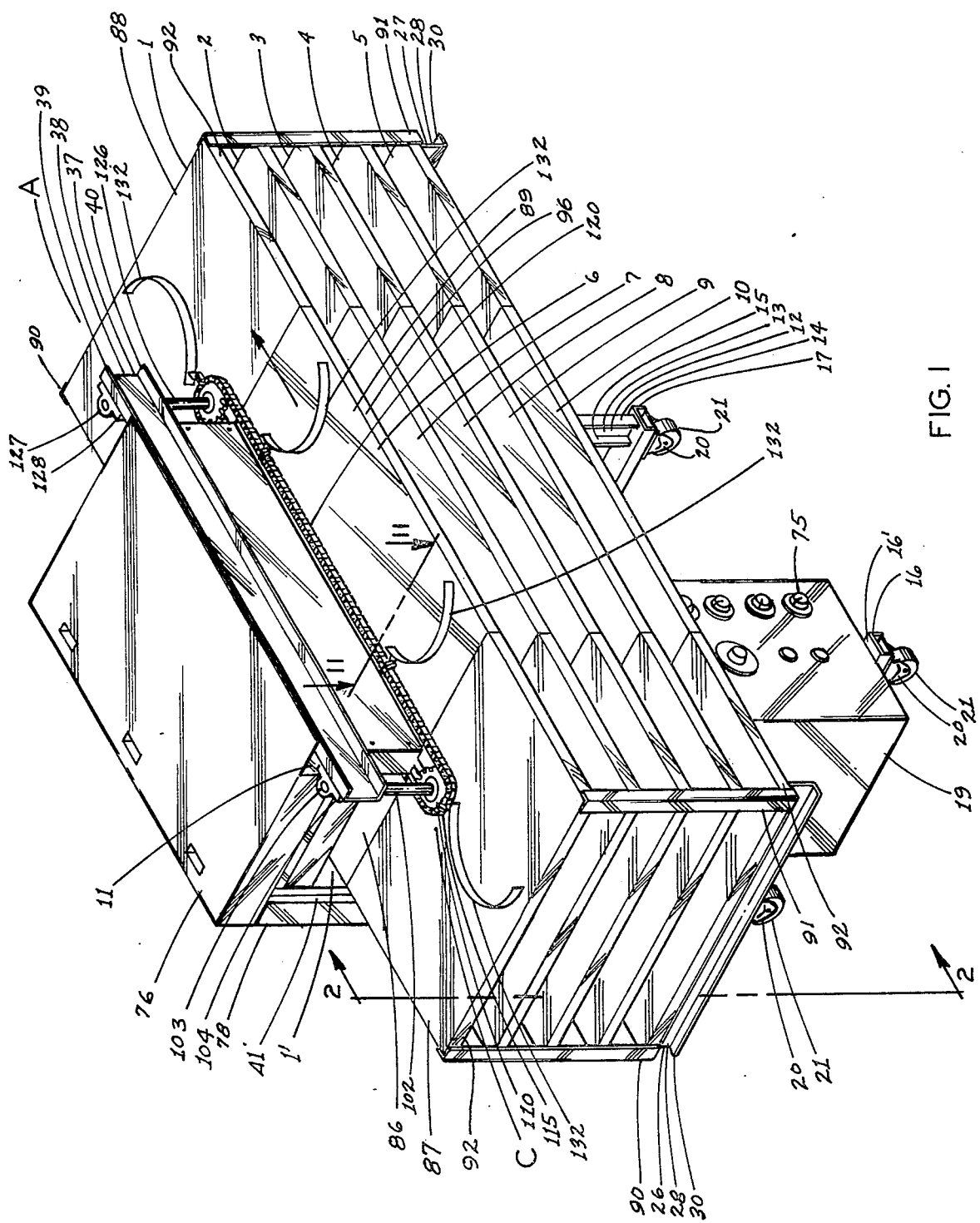
FIG. 1 is a perspective view of a multiple tier oven constructed in accordance with and embodying the present invention.

Referring now by reference numerals to the drawings, A designates a multiple tier oven designed primarily for heat and serve purposes, as wherein partially prepared or frozen foods may be subjected to requisite heating for prompt serving so that the same, as developed hereinbelow, is particularly adapted for what is currently known as fast food service, and especially where there is a demand for servings in relatively high volume in minimum time. Oven A has manifest application for industrial and commercial usage and, therefore, it is to be understood that any description hereinbelow of the use of said oven in conjunction with food items is merely exemplary and, therefore, not to be interpreted as retrictive.

As will be shown in more detail below, oven A is of multiple tier or deck character, being shown herein for purposes of exposition only as having five such tiers 1, 2, 3, 4, and 5 in superimposed, registering, vertically spaced-apart relationship and with each such tier having a discrete oven chamber 1', 2', 3', 4', 5', respectively, and a service deck 6, 7, 8, 9, and 10, respectively, aligned planarwise with the floor of the related oven chamber. Oven A is provided with a basic framework F and by means to be shown is mobile for ease of transport to preselected locations.

Figure 2:
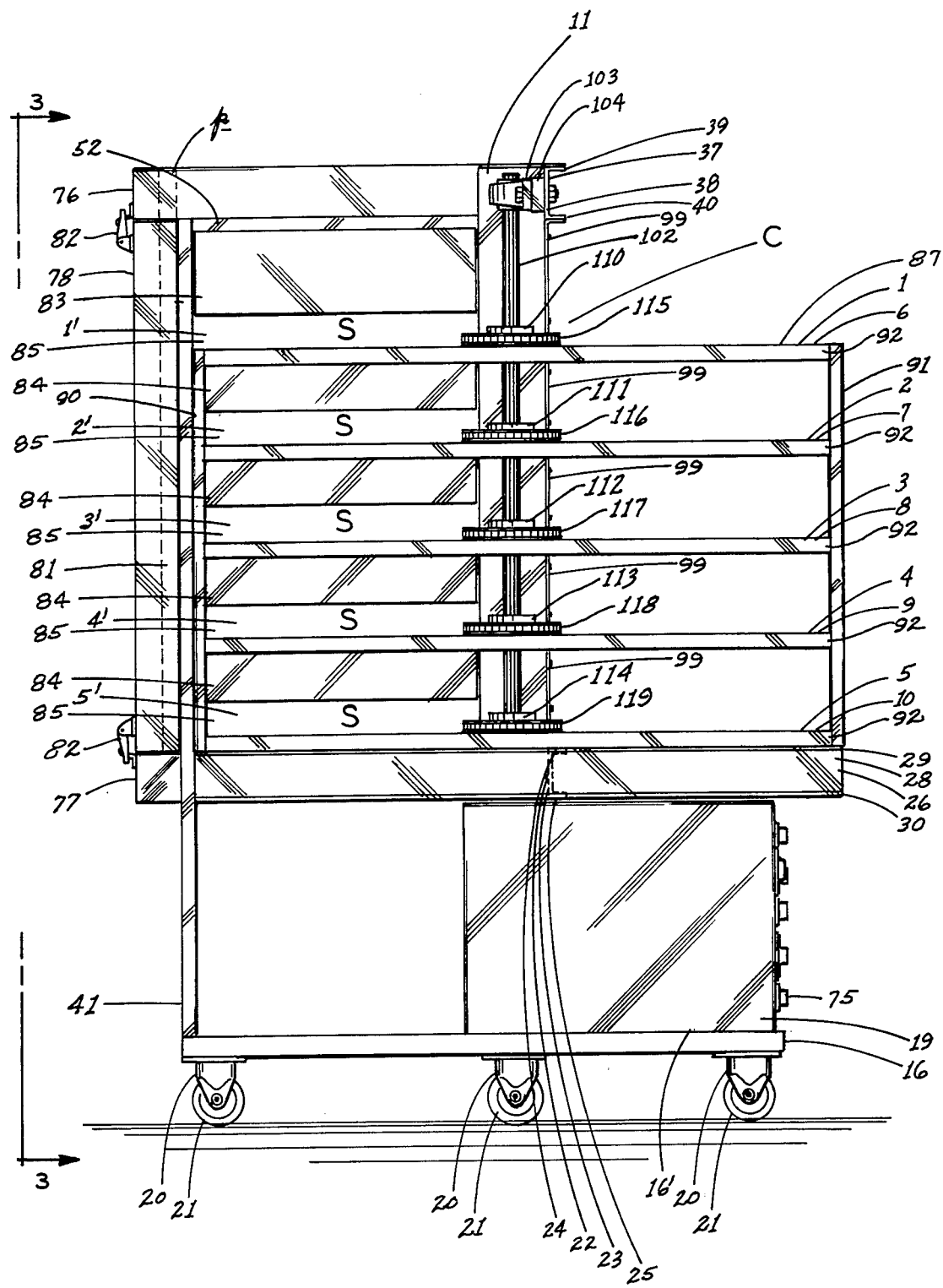
FIG. 2 is an end elevational view taken on the line 2—2 of FIG. 1.

For purposes of orientation, the forward side of oven A is that directed toward the right hand side of FIG. 2, while the rearward side is directed toward the left hand side of said FIGURE so that the longitudinal axes of, or paths of travel through, oven chambers 1', 2', 3', 4', 5' are parallel to the longitudinal axis of oven A and with the same being presented in the rearward central portion of said unit of said device.

Figure 3:
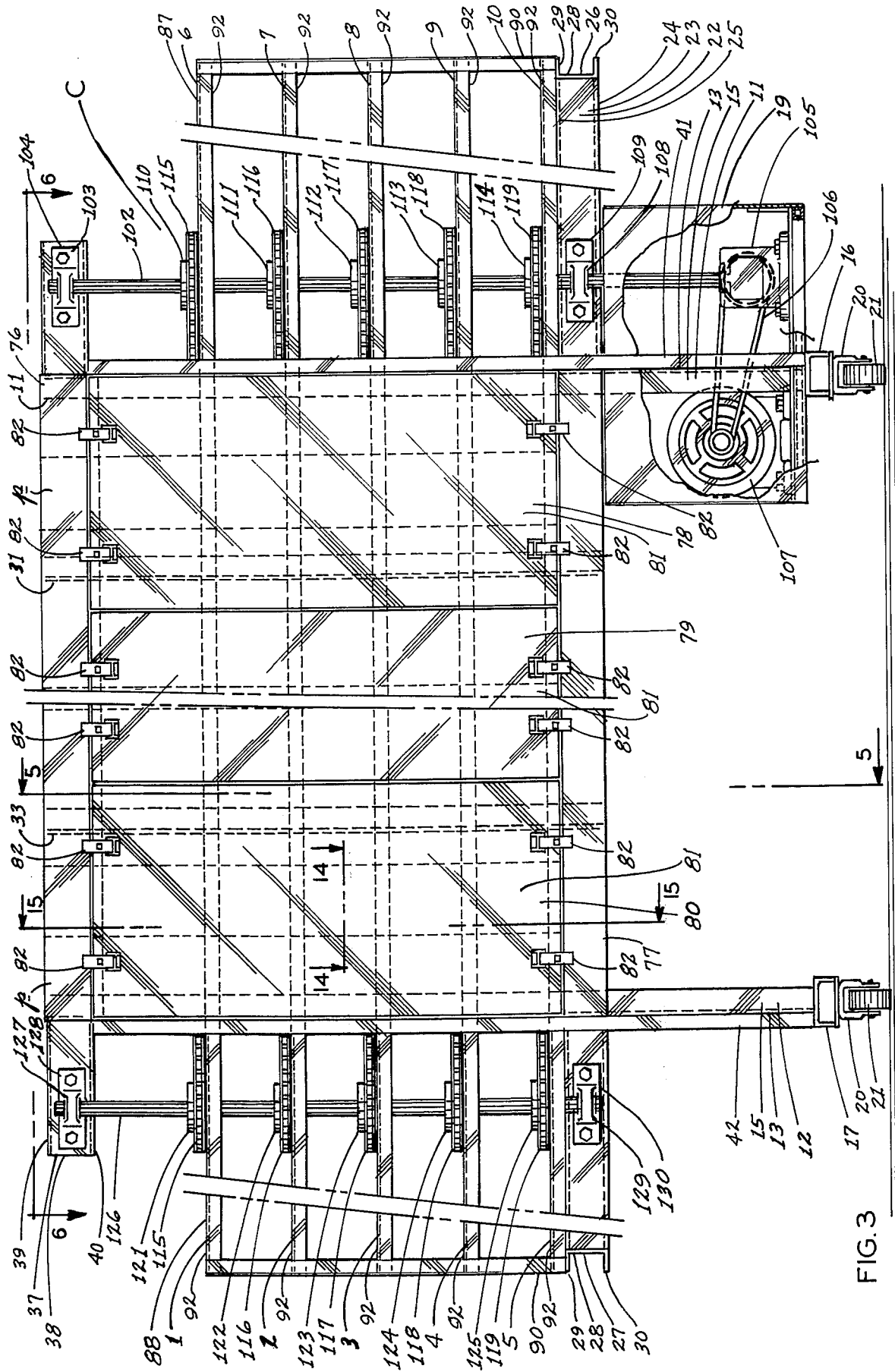
FIG. 3 is a rear view taken on the line 3—3 of FIG. 2 with a portion of the wall of the control housing broken away.
Figure 4:
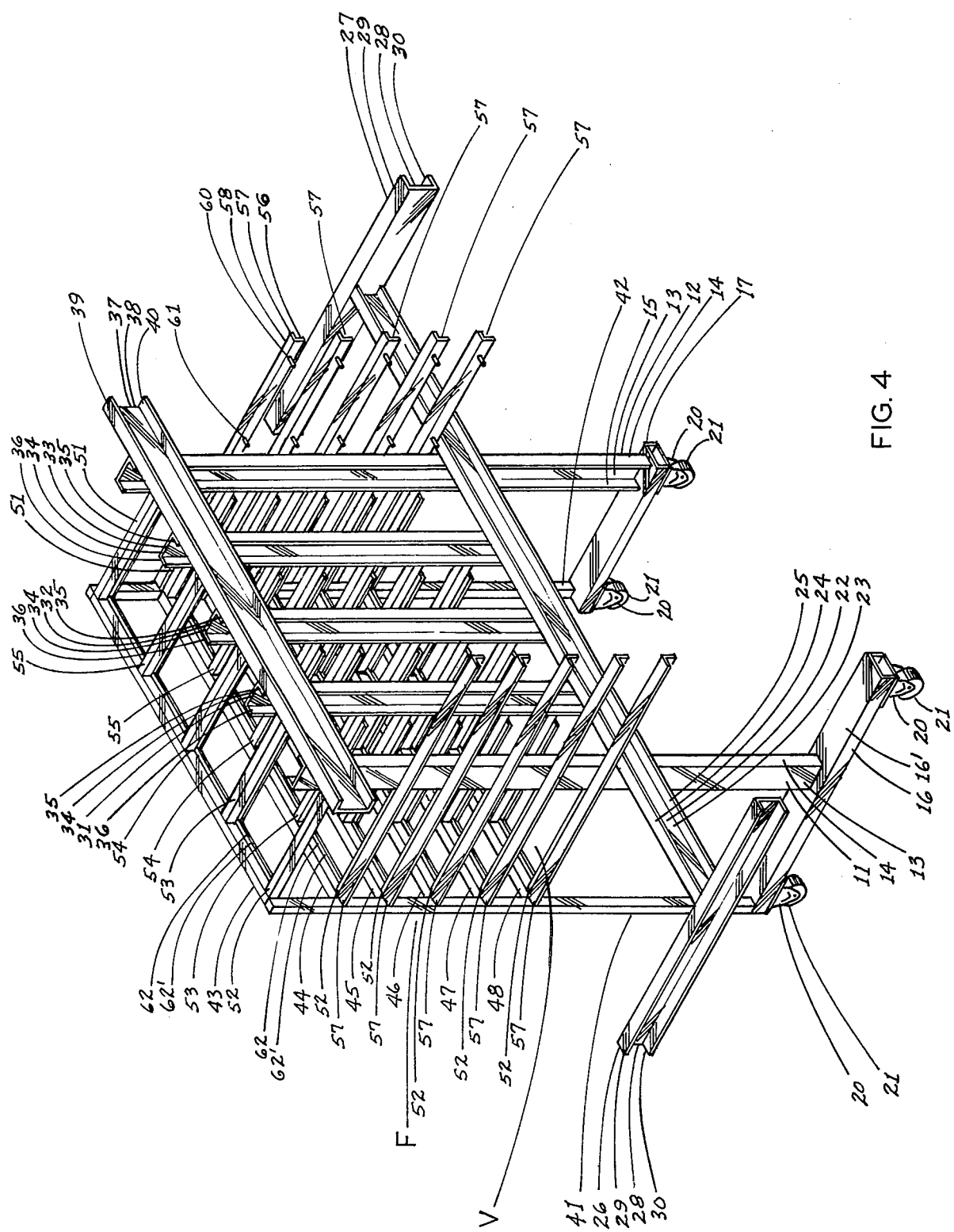
FIG. 4 is a perspective view of the basic frame.

Turning now to FIG. 4, the basic frame or rigid framework F will be described and with the same comprising a pair of horizontally spaced-apart and aligned studs 11, 12 each of which are desirably of channel construction, opening toward each other and each having webs 13 and forward and rearward flanges 14, 15. Said studs 11, 12 at their lower ends are rigid upon base plates 16, 17, respectively, which may be of tubular stock, being rectangular in cross-section for rigidifying purposes. Said base plate 16 is aligned at its rearward end with base plate 17 but is of greater length than said latter and, hence, projects forwardly thereof to define a support surface 16' for a drive or control housing 19 which encloses the lower portion of such stud 11 (see FIG. 3), mounted on the opposite ends of each base plate 16, 17 as by suitable brackets 20, are wheels 21, permitting of ready mobility of oven A. Substantially centrally of their length, studs 11, 12 are secured, as by welding, upon their forward flanges 14 to the web 22 of a lower longitudinal beam 23 being of forwardly opening channel character and having upper and lower flanges 24, 25 which projects at its ends beyond said studs 11, 12 and at the related end extremities is rigid with end beams 26, 27 respectively; both being substantially the same length as base plate 16 and each being of endwise opening channel form having webs 28 and upper and lower flanges 29, 30. Between studs 11, 12 there are provided a plurality of uprights 31, 32, 33, each of which is also desirably of channel form, having a web 34 and forward and rearward flanges 35, 36. Said uprights 31, 32, 33 upon the lower end of their forward flanges 35 are fixed to the rearward face of the web 22 of longitudinal beam 23 and with the upper ends being aligned with those of studs 11, 12. Said studs 11, 12 and uprights 31, 32, 33 in their upper end portions are rigid, as by welding, on their forward flanges 14, 35, respectively, with the rearward face of the web 37 of an upper horizontal beam 38 of relatively reduced length with respect to lower horizontal beam 23 terminating at its ends a slight distance beyond each stud 11, 12. Upper horizontal beam 38 is also preferably of channel construction, opening forwardly and having upper and lower flanges 39, 40.

At the rearward end of each base plate 16, 17 there are fixed the lower ends of posts 41, 42 which are of selected tubular stock being preferably square in cross section and with the upper ends thereof being aligned but terminating below the upper ends of studs 11, 12. Said posts 41, 42 are interconnected by horizontally disposed, vertically aligned and spaced-apart connectors 43, 44, 45, 46, 47, 48; with said connector 43 extending between the upper ends of said posts 41, 42 and the lowermost connector 48 being presented slightly above lower longitudinal beam 23 (see FIG. 5). Said connectors 43, 44, 45, 46, 47, 48, inclusive, are also preferably of tubular stock being square in cross section for providing maximum strength with minimum weight. Each of said connectors 43, 44, 45, 46, 47, 48 is interconnected with studs 11, 22 by transversely extending end components 51, 52, respectively, and by intermediate components 53, 54, and 55, with the rearward flanges 36 of uprights 31, 32, 33, respectively. It will be appreciated that the end components 51, 52 and intermediate components 53, 54, 55 associated with each connector 43, 44, 45, 46, 47, 48 are vertically aligned with the corresponding components bridging the distance between each of said connectors and the associated frame studs and uprights. Each of said end components 51, 52 and intermediate components 53, 54, 55 are also of choice of square tubular stock.

Rigid with the endwise directed face of each end component 51, 52 associated with connectors 44, 45, 46, 47, 48 is the vertical flange 56 of an angle shaped support arm 57 having a horizontal flange 58 which extends endwise of oven A. Said support arms 57 are related to the respective end components 51, 52 to present horizontal flanges 58 slightly above the upper surfaces of the adjacent end components 51, 52 to develop a shoulder-forming spacing 59 for purposes presently appearing.

Said arms 57 abut at their rearward ends against the forward faces of posts 41, 42 and their forward portions extend beyond studs 11, 12 substantially aligned with the forward end of base plate 16. Said arms 57 are of like length with their forward end extremities in registration and forwardly of studs 11, 12, each carries on the inner surfaces of their vertical flanges 56 a pair of spaced apart forward and rearward pins or projections 60, 61 for purposes to be described.

Figure 5:
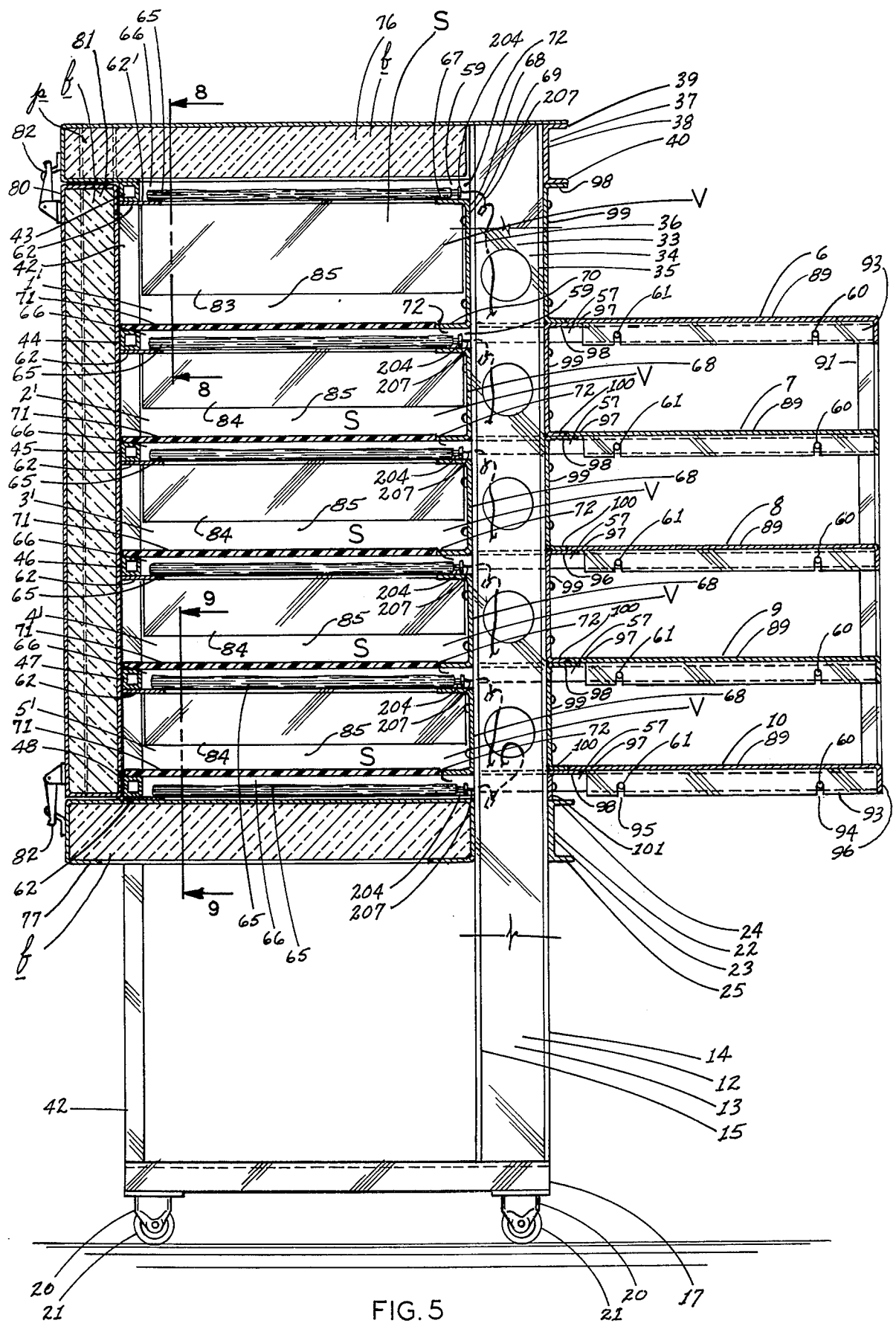
FIG. 5 is a vertical transverse sectional view taken substantially on the line 5—5 of FIG. 3, but omitting the conveyors for purposes of clarity.
Figure 6:
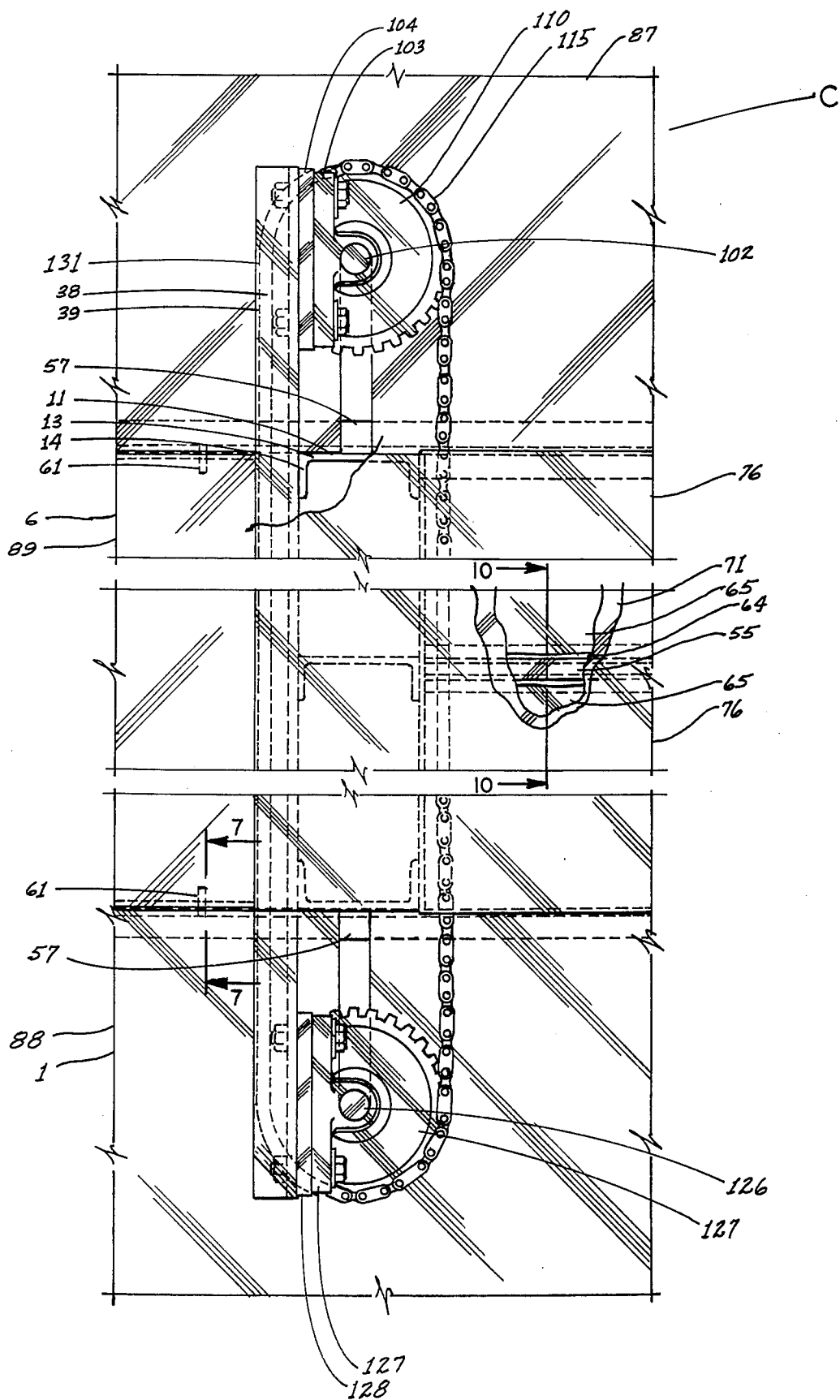
FIG. 6 is a top plan view taken on the line 6—6 of FIG. 3.
Figure 10:
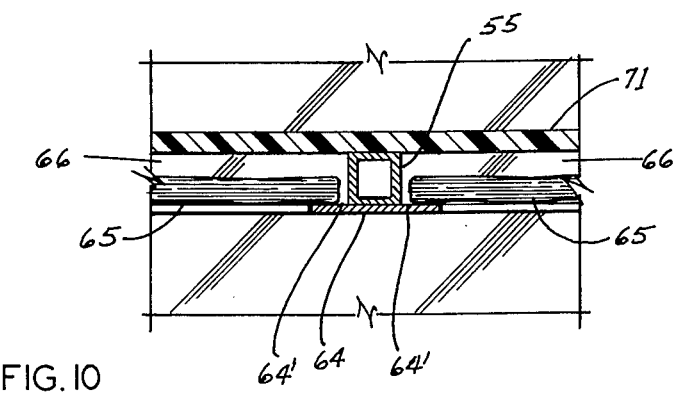
FIG. 10 is a vertical transverse sectional view taken on the line 10—10 of FIG. 6.
Figure 11:
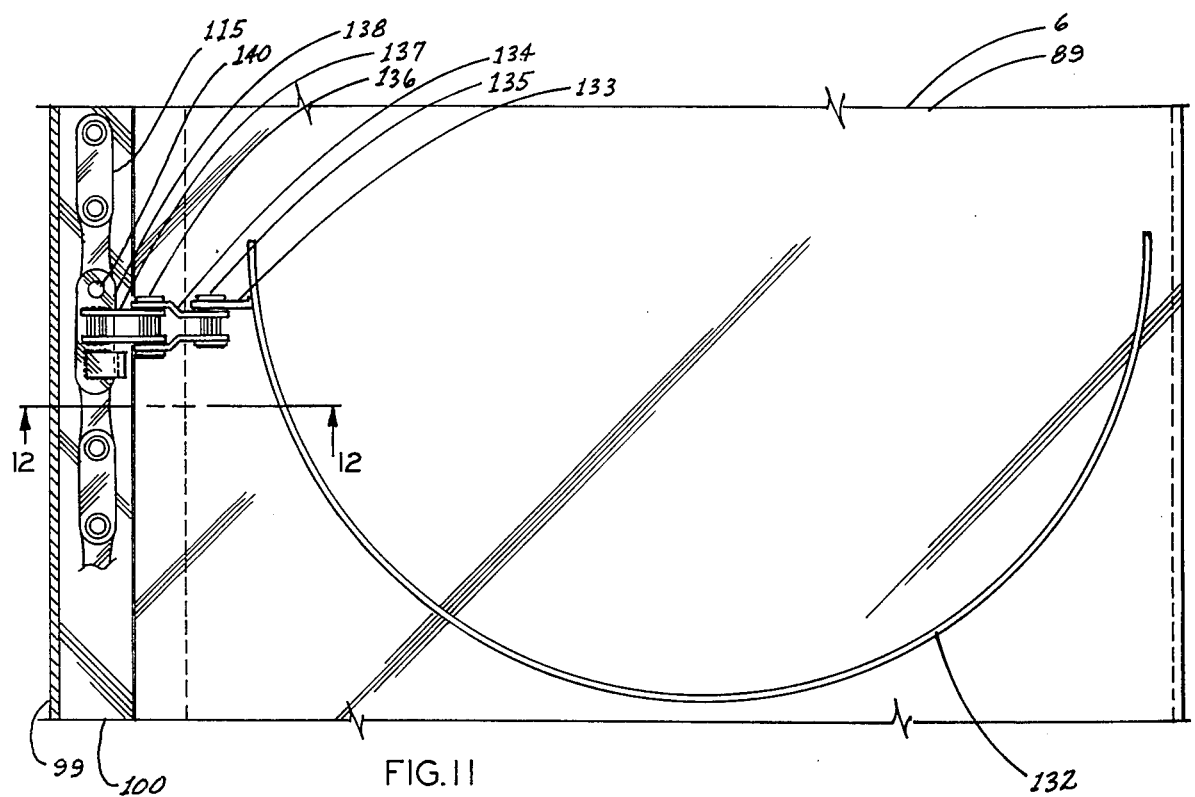
FIG. 11 is a top plan view taken on the line 11—11 of FIG. 1.
Figure 13:
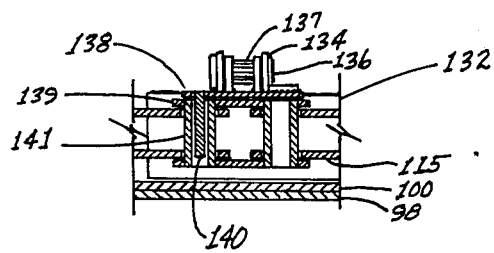
FIG. 13 is a vertical transverse sectional view taken on the line 13—13 of FIG. 12.
Figure 12:
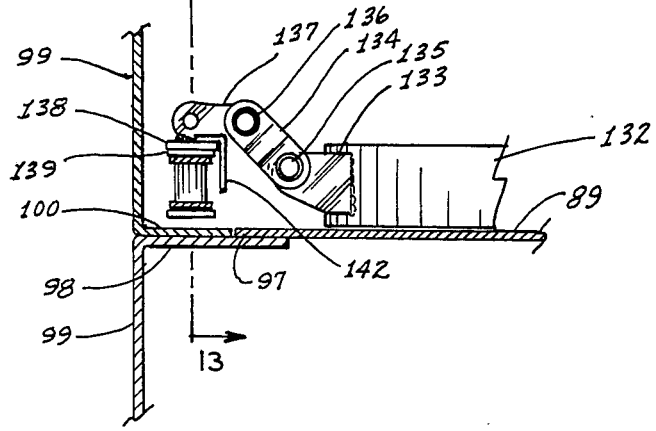
FIG. 12 is a vertical transverse sectional view taken on the line 12—12 of FIG. 11.
Figure 16:
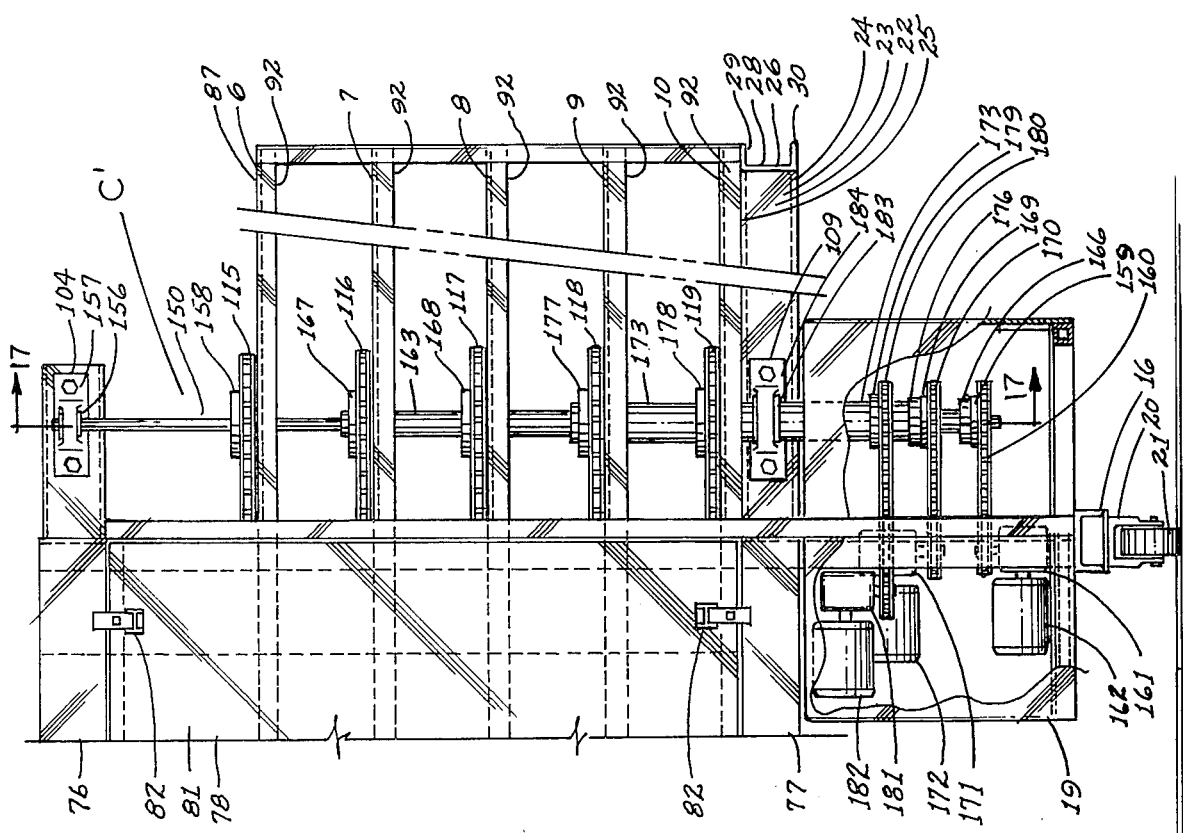
FIG. 16 is a rear view taken substantially on the line 3—3 of FIG. 2 with a portion of the wall of the control housing broken away and illustrating another form of conveyor arrangement.
Figure 16:
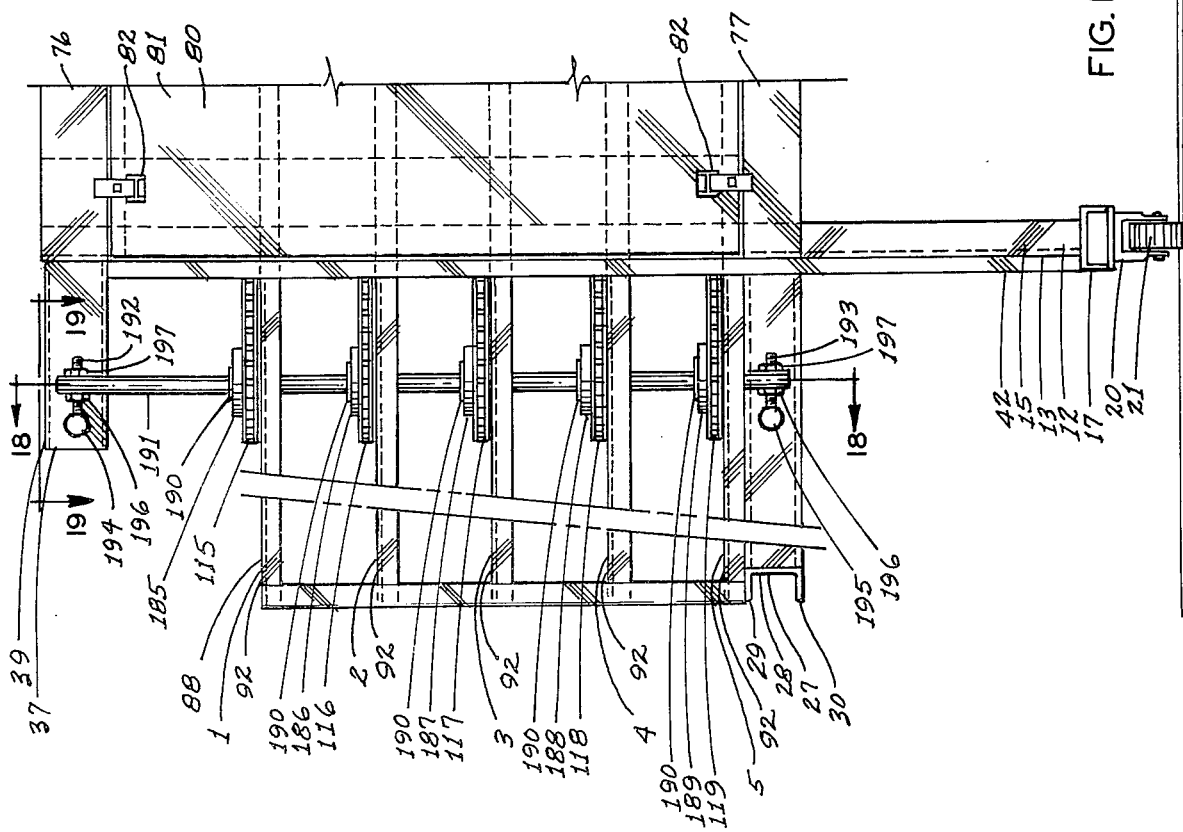
Figure 20:
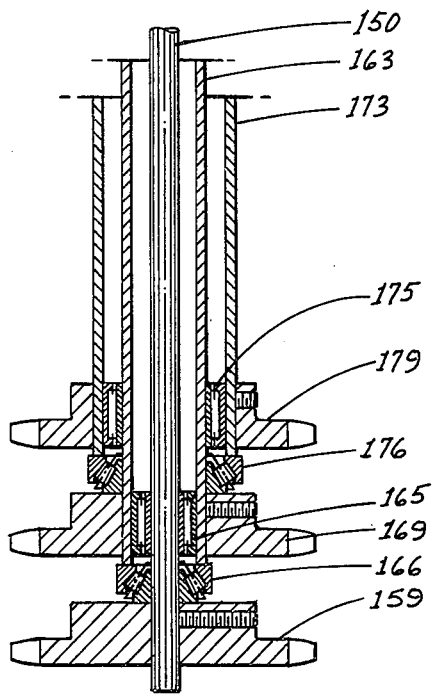
FIG. 20 is an enlarged view of the portion circled in FIG. 17.
Figure 21:
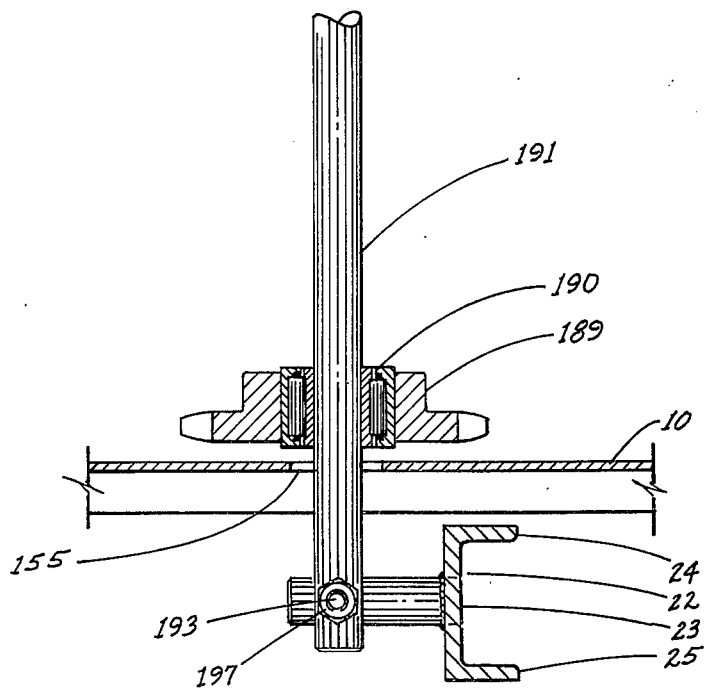
FIG. 21 is an enlarged view of the portion circled in FIG. 18.

Secured to the underside of each connector 43, 44, 45, 46, 47, 48 and being coextensive therewith is an elongated narrow plate 62 which extends but slightly forwardly of the related connector to define a ledge-like support surface, as at 62'. Each of said end components 51, 52 also have fixed to their under-surface substantially coextensive elongated plates 63 which extend slightly inwardly, defining support surfaces in planar alignment with plates 62, as at 63'. Engaged to the under-face of each intermediate component 53, 54, 55 is a support plate 64 which is of slightly greater width than the related component so as to extend endwise of oven A from both sides of said components to define oppositely extending support surfaces 64' (FIG. 10) for cooperating with the adjacent support surfaces 62', 64' for supporting thereon discrete heating panels 65 which may be of the infrared emitter type as more fully set forth and described in U.S. Letters Patent No. 3,809,859 issued May 7, 1974. It will accordingly be seen that connectors 43, 44, 45, 46, 47 and 48 together with the end components 51, 52 and intermediate components 53, 54, 55 coordinate to define six superimposed horizontal series of four discrete volumes V, each of which volume accepts an individual heating panel 65. Each panel 65 has a thickness slightly less than the height of the adjacent connectors and components so that their upper surfaces are spaced slightly downwardly therefrom, as indicated at 66 (FIG. 5). The forward edge portions of each heating panel 65 are restingly received upon the upper surface of the top flange 67 of the inner closure panel 68 as of rearwardly opening channel configuration having a vertical web 69 which defines the forward limit of the related oven chamber 1', 2', 3', 4', 5', as the case may be, and having a bottom flange 70 received within the forward end portion of the adjacent spacing 59 and, hence, constituting the forward upper limit of the underlying volume V. Said closure panels 68 are detachably affixed as by any suitable means, such as screws or the like (not shown) to the rearward flanges 36 of uprights 31, 32, 33 and rearward flanges 15 of studs 11, 12, as the case may be. If desired, there may be an independent closure panel 68 for each oven section S which overlies each volume V. Said oven sections S in any one tier being continuous to define the particular oven chamber 1', 2', 3', 4', 5', as the case may be. Should such be desired there might be a continuous closure panel 68 accommodating all of the sections S comprising a particular oven chamber within any one tier so that by the former arrangement access to discrete oven sections S may be accorded, or by the latter arrangement access may be achieved simultaneously to the entirety of any one oven chamber through removal of the comprehensive closure panel 68.

With particular reference to FIGS. 5, 8, 9 and 10, it will be observed that there is supported upon the upper surfaces of end components 51, 52 and intermediate components 53, 54, 55, with the exception of those associated with top connector 43, within each chamber 1', 2', 3', 4', 5' a unitary hearth 71 being of plate character and preferably of treated glass, as in the order of 3/16 of an inch, which at its ends is received within the spacings 59 so as to abut against the proximate portion of vertical flange 56 of arm 57 to inhibit endwise displacement. Hearths 71 constitute the floor of each oven chamber 1', 2', 3', 4', 5' as well as the upper limit of the underlying volume V and by virtue of the height of the end components 51, 52 and intermediate components 53, 54, 55 supporting same said hearths are spaced slightly above the underlying heating panel 65 for receiving heat therefrom for transfer. Each volume V, or the transverse spacing between adjacent parallel transverse components 51, 52, 53, 54, 55 opens forwardly between the cooperating studs 11, 12 and uprights 31, 32, 33, as at 72, for forward extension therethrough of a cable to be described more fully hereinbelow, which proceeds from an insulating tube receiving leads from the terminals of the heating elements of the related panel 65. Said cables, as will be shown, are suitably conducted to housing 19 for such connection that the heating panels 65 in any one horizontal arrangement are in circuit with an independent control, as indicated generally at 75. The particular circuitry, which will be described more fully below, is adapted so that the heat within any one oven chamber 1', 2', 3', 4', 5' may be independently controlled whereby at the election of the operator each such oven chamber may have a preselected temperature. Thus, obviously, the heating panels 65 in any one series will be interconnected by suitable circuitry for connection to the related control.

With reference to FIG. 5 it will be seen that the uppermost heating panel 65 is not associated with an overlying hearth, but is presented immediately beneath a top insulating panel 76 which comprehends a body of suitable insulating material as of fiber type, indicated $f$, and being metal encased; being affixed along its forward edge portion of the upper ends of studs 11,12 and uprights 31, 32, 33, as well as resting upon the upper surfaces of connector 43 and the like surfaces of components 51, 52, 53, 54, 55. Secured along its forward face to the rearward flanges 15 studs 11, 12 and rearward flanges 36 of uprights 31, 32, 33 at the lower end of the latter is a bottom insulating panel 77 also containing suitable insulation, such as fibrous material indicated $f$ and being metal encased. Said lower insulating panel 77 is stabilized in position by securement of the under face of the immediately overlying plates 62, 63, 64 secured to the adjacent connector 48 and transverse components 51, 52, 53, 54, 55. It will be seen by reference to FIG. 5 that said upper and lower insulating panels 76, 77 are in registering relationship projecting at the rearward ends beyond posts 41, 42 and being disposed within the zone bounded thereby. Presented between the rearward extended portions of insulating panels 76, 77 is a plurality of discrete closure insulating panels 78, 79, 80 (FIG. 3) which at their upper and lower ends are detachably engaged to said upper and lower insulating panels 76, 77 as by manually operable clasps 82. The rearward closure is thus comprised of preferably but three insulating panels 78, 79, 80 so that by removal of any one of the same, access is accorded to the adjacent portions of the superimposed sections S of the various oven chambers. It is obvious that any number of such panels could be used. Therefore, the plurality of rearward closure panels allows of selected access to the oven chambers for cleaning and inspection purposes. Each of said closure panels 78, 79, 80 also contain insulation, preferably of fibrous material indicated $f$, and being metal encased. On their inner faces each of said closure panels 78, 79, 80 substantially centrally is provided throughout its vertical extent with an inwardly opening recess 81 which at its upper end communicates with an opening $p$ of like cross-sectional area and contour within top closure panel 76. Thus, said recesses 81 together with openings $p$ provide exhaust passages for the proximate portions of the oven chambers 1', 2', 3', 4', 5'.

Depending from the edge of each plate 63 affixed to end components 51 and the forward end edge of each such plate affixed to the end component (not shown) except for the lowestmost end components 51, 52 is a vertical plate 83, 84 constituting partial end closures for the related oven chambers; which plates terminate at their lower ends spacedly upwardly of the related oven floor to respectively constitute oven chamber ingresses and egresses 85, 86, respectively. Each service desk 6, 7, 8, 9, 10 is of like construction so that only a single deck will be described for purposes of exposition. Accordingly, it will be seen that each such deck is comprised of opposed fixed end sections 87, 88 and a forward removable central section 89. Each end section 87, 88 has a forward to rearward dimension substantially the same as the length as end beams 26, 27 with their rearward edges substantially aligned with the rearward edge of the floor or hearth 71 of the related oven chamber and with their forward edges extending forwardly of the related oven chamber for cooperating with the central section 89 in presenting a service area coextensive with the length of said unit. Said end sections 87, 88 project endwise beyond the end of the related oven chamber a distance suitable for movement thereacross of the food being treated. Said end sections at their inner ends are received upon the upper surface of horizontal flange 58 of the immediately underlying support arm 57 and with the particular assemblage of sections 87, 88 at each end being interconnected by corner angle members 90, 91 for retaining the sections of each assembly in proper vertically spaced-apart relationship and with the assemblages of sections 87, 88 being suitably supported upon the upper flanges of end beams 26, 27, respectively. Each end section is of sheet material and rigidified on their forward, rearward, and outer end edges as by a continuous depending flange or skirt 92. The inner end edges of said end sections 87, 88 forwardly of the related oven chambers terminate so as to avoid projection inwardly of the supporting flange 58.

Figure 7:
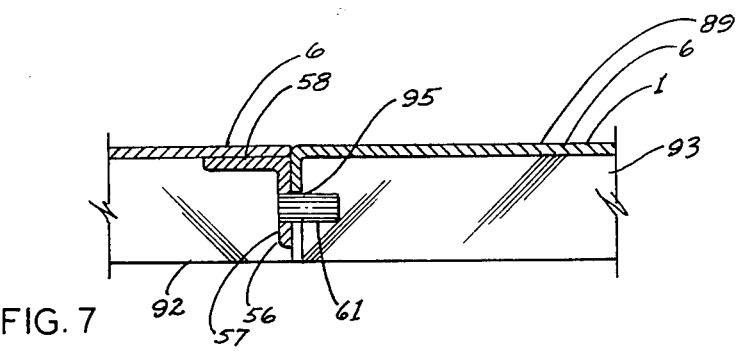
FIG. 7 is a transverse sectional view taken on the line 7—7 of FIG. 6.
Figure 8:
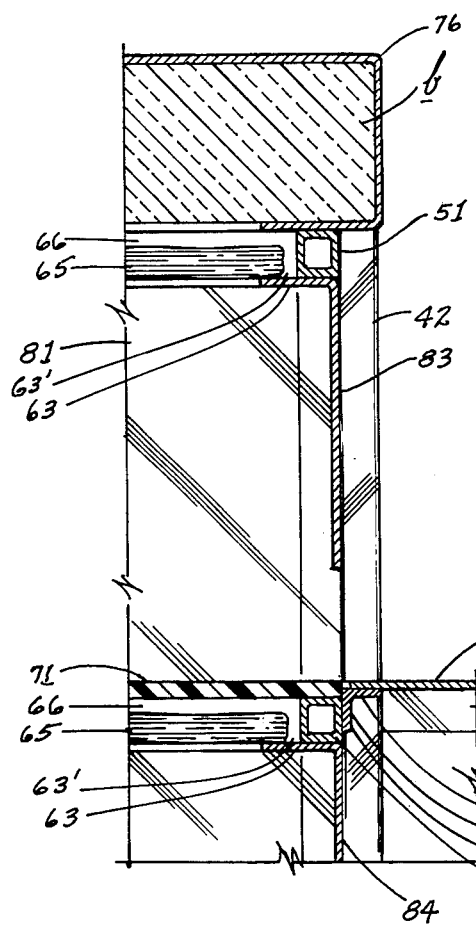
FIG. 8 is a vertical transverse sectional view taken on the line 8—8 of FIG. 5.
Figure 9:
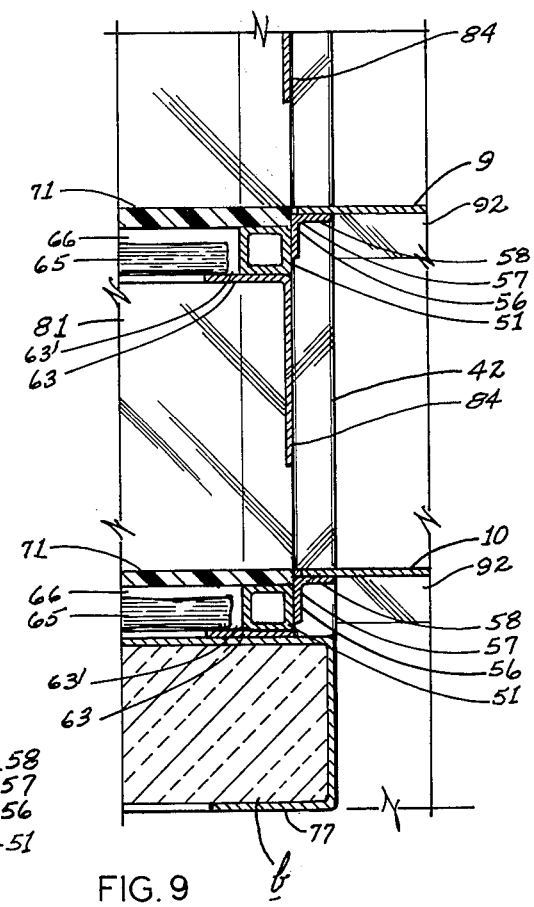
FIG. 9 is a vertical transverse sectional view taken on the line 9—9 of FIG. 5.

Each central section 89 is provided with end depending flanges 93 having upwardly opening forward and rearward recesses 94, 95 for accepting forward and rearward pins 60, 61 extending from the adjacent support arms 57 (see FIGS. 5 and 7) which thus serve to maintain said sections 89 in deck forming relationship. Each of said sections 89 is provided with a depending flange 96 along its forward margin for rigidifying purposes, and each of said sections 89 along its rearward edge extends beyond the related flanges 93 to present a tongue-like projection 97 which is restingly received upon the upper surface of the upper flange 98 of an underlying, front closure 99 which is preferably of forwardly opening, channel form having a base flange 100. Thus, the tongue projections 97 of each section 89 abut edgewise against the confronting edge of the lower flange 100 of the overlying front closure 99, while resting upon the upper flange 98 of the underlying front closure. Said front closures 99 are suitably secured as by screws or the like to the front flanges 14 of studs 11, 12 and front flanges 35 of uprights 31, 32, 33 for effectively closing the forward end of each oven section S. It is, of course, apparent that said front closures 99 may thus correspond in number to each oven section S or may be, if desired, continuous for extending the full length of each oven chamber, if desired. The uppermost front closure 99 is of slightly greater height than the remaining closures and with its upper flange 98 abutting against the base flange 40 of upper horizontal beam 38. Although said closures 99 are adapted for fitted disposition for closing purposes, the same may be, if desired, interengaged with overlying and underlying closures as by fasteners, such as screws, extending between the abutting flanges or by fasteners extending through the bases of said closures and the forward flanges of studs 11, 12 and uprights 31, 32, 33. The vertically arranged series of closures 99 is further supported by lower horizontal beam 23 with there being an intermediate support angle 101 between the top flange 24 of the latter and the lower flange 100 of the immediately overlying closure 99.

From the foregoing it will be apparent that by removal of central sections 89, together with the underlying closure plate 99, access is immediately provided to the adjacent chamber volume so that the received heating panel 65 may be removed for replacement or the associated wiring may be checked to rectify any defects. Thus, all volumes V may be exposed simultaneously so that the entire circuitry is available for inspection or only certain portions thereof may be exposed by selected removal of sections 89 and closure plates 99. This ready accessibility can be achieved without the utilization of tools and can thus be attained by relatively unskilled individuals and with there being no necessity of dismantling other portions of the system which would not necessarily be involved in such inspection. As pointed out above, through removal of rear closure panels 78, 79, 80, a like accessibility is provided for the oven chamber sections S for cleaning or hearth replacement and the like. Consequently, the novel construction of the present invention obviates resort to time consuming, costly breakdown with attendant inconvenience of down time so that any noted imperfections in operation can be promptly and easily corrected with minimum loss in operation.

A unique multiple conveyor assembly, as denoted generally C, is provided with the present invention to expedite movement of articles or food to be heated into the oven chambers and removal of the same in heated condition therefrom, and as shown in FIGS. 2 and 3 is of the type wherein each conveyor operates at the same speed. Said assembly comprises a vertically disposed main shaft 102 projecting through vertically aligned openings (not shown) in end sections 87 of serving decks 6, 7, 8, 9, 10, endwise and immediately forwardly of the egress 86 of oven chambers 1', 2', 3', 4', 5'. At its upper end shaft 102 is journaled within a pillow block 103 mounted upon a bearing bracket 104 fixed, as by bolts, to the rearward face of the web 37 of upper horizontal beam 38 and with its lower end extending into housing 19 wherein it is engaged to a gear reducer 105 operatively connected by an endless belt 106 to a prime mover 107 carried within said housing 19. Immediately above housing 19, shaft 102 is journaled in a pillow block 108 fixed upon a bracket 109 secured, as by bolts, to the rearward face of the web 22 of lower horizontal beam 23. Splined, keyed, or otherwise fixed on shaft 102 for rotation therewith is a series of vertically spaced-apart sprockets 110, 111, 112, 113, 114 immediately above end sections 87 of decks 6, 7, 8, 9, 10, respectively, for engaging one end portion of endless conveyor chains 115, 116, 117, 118, 119, respectively. Each of said chains include a forward course 120 which travels longitudinally of the respective deck, as from end section 87 to end section 88, forwardly and exteriorly of the related oven chamber. In their opposite end portions each of said chains 115, 116, 117, 118, 119 are engaged about sprockets 121, 122, 123, 124, 125, respectively, which are keyed or otherwise carried upon an idler shaft 126, axially parallel to main shaft 102. The upper end of idler shaft 126 is journaled in a pillow block 127 carried upon a bracket 128 fixed upon the rearward face of upper beam 38 at the end thereof opposite to that carrying pillow block 103. The lower end of idler shaft 126 is journaled within a pillow block 129 mounted upon a bracket 130 fixed on the rearward face of the web of lower beam 22 opposite to that carrying pillow block 108. Thus, idler shaft 126 is located endwise of the oven chambers in a direction toward deck end sections 88 and immediately forwardly of the proximate chamber ingress 85. Each chain 115, 116, 117, 118, 119 also includes a rearward course 131 which progresses through the adjacent chamber oven, immediately above the floor thereof and in proximity to the closure panels 68.

With reference now being made to FIGS. 1, 11, 12 and 13, it will be observed that there is provided for detachable engagement upon each endless chain 115, 116, 117, 118, 119 a plurality of preferably arcuate sweep arms 132 which open in a direction toward deck end sections 88 during the normal travel of the associated chains so that said arms 132 may direct suitably supported food items toward and through the oven chamber of the associated deck; the direction of travel being indicated by an arrow as shown in FIG. 1. It will be observed that the diameter upon which said sweep arms 132 are formed is so related to the traversed portion of the related docks as to permit of full supported sliding action of the food to be heated. The sweep arms 132 are shown as being particularly useful with food received within platters, pans, plates and the like, but obviously said sweep arms may be altered without departing from the spirit of this invention so as to be of complementary form for accommodating food items directly of various configuration or containers of predetermined contour. The number of sweep arms 132 carried upon any conveyor chain 115, 116, 117, 118, 119 is a matter of choice depending upon the capacity of the operator to remove heated foods and replace same with unheated items. Each sweep arm 132 proximate its inner end carries a bracket 133 to which is pivotally engaged a link 134, as by a pivot pin 135, which latter carries a second pivot pin 136 for engagement to one end of an arm 137; the opposite end of which is rigid with a plate 138 dimensioned for flatwise disposition upon a link 139 of the respective conveyor, such as 115. Said plate 138 at its normally forward end when considered from the standpoint of its direction of travel is fixed to the upper end of a depending locking pin 140 for extension within the bore of the underlying rivet or hollow pin 141 engaging the adjacent link sections of the related conveyor chain 115, as the case may be. Said plate 138 in the side of arm 137 remote from pin 140 is provided with a depending detent 142 on the normally outer side of said plate 138 and being disposed for limiting any rocking of plate 138 with respect to the underlying chain link when the same is directed about the associated sprockets, such as 110, 121.

It will thus be seen that sweep arms 132 are readily detachable by the mere act of lifting upwardly so as to remove the respective pin 140 from engaged condition. By this novel means of attachment, sweep arms 132 can thus be positioned in any desired relationship upon the particular conveyor chain.

The operation of the present invention should be readily apparent from the foregoing. By manipulation of a conveniently located control switch, prime mover 107 is energized so as to effect rotation of main shaft 102 with consequent rotation of idler shaft 126. Controls 75 are then set to cause the development of the desired heat within the associated oven chamber 1', 2', 3', 4', 5', as the case may be. The food items to be heated are then placed upon the particular serving deck of the related tier wherein the oven is heated to the prescribed temperature and the sweep arms 132 will thus conduct same along said deck, thence through the ingress 85 of the particular oven chamber, through such chamber and, thence, outwardly of the chamber egress 86 so that within end section 87 of the related tier the operator may remove the heated food and deliver an unheated unit to the momentarily free sweep arm 132. The cooking operation is manifestly dependent upon two primary factors; one being the temperature of the oven chamber and the other being the length of time during which the particular food item is exposed to such temperature. Consequently, the length of the oven chambers, as well as the rate of travel of the endless conveyor chains 115, 116, 117, 118, 119 are coordinated to accomplish the desired food heating.

It will thus be seen that each oven chamber is of the radiant type having its own independent source of heat. The hearth 71, as being fabricated of a unitary sheet of properly treated glass, provides for an equal distribution of heat having received same from the underlying heating panel 65 and which panels also radiate heat downwardly within the underlying oven chamber. Each oven chamber therefore is heated by its associated heating panels located in the upper portions of such chambers as well as from the heat transference through the floor or hearth from the heat of the underlying heating panel. The sweep arms 132 assure of maintenance of the food to be cooked with the hearth throughout the entire travel through the related oven chamber since it causes a sliding motion thereby assuring of consistent contact of the food or the food receptacle with the hearth during the entire traverse of the particular oven chamber. This unique feature assures of uniformity of heating of the food item and obviates the unpleasant affects as heretofore obtained with currently used ovens resulting from an uneven heating. Also, as pointed out the food item is simultaneously receiving heat from the overlying heating panel 65 so that in effect heat is moving both upwardly and downwardly through the food item being heated.

The glass of the hearth 71 does not form a part of the present invention since there are various high temperature glasses commercially available, such as, particularly, one identified by the trademark HERCUVITE of PPG Corporation.

As brought out more fully hereinabove, the present invention is uniquely constructed for ready cleaning of the oven chambers, as by removal of the various rear closure panels 78, 79, 80, and the circuitry is equally accessible for inspection and repair as by the facile removal of deck sections 89 and front closure 99.

Turning now to FIGS. 16 through 21, another form of a multiple conveyor assembly generally denoted C' is useful with the present invention and being designed to permit of a speed differential in the rate of movement of the conveyors on each tier, as distinguished from assembly C above described, wherein each conveyor operates at the same speed.

Assembly C' comprises vertically disposed central main shaft 150 of relatively reduced diameter projecting through vertically aligned, relatively enlarged openings 151, 152, 153, 154, 155 in serving decks 6, 7, 8, 9, 10, respectively, with its upper end being received within a needle or other type bearing 156 engaged within a pillow block 157 mounted upon bearing bracket 104. Immediately above serving deck 6 there is mounted upon shaft 150, as by means of a set screw or the like, a sprocket 158 for engaging one end portion of endless conveyor chain 115, while at its lower end said shaft 150 mounts a similar sprocket 159 for connection to a belt 160 for connection to a gear reducer 161, which latter is operatively connected to a prime mover 162 located within housing 19. Surrounding main shaft 150 from a point slightly above serving deck 7 to a point immediately above sprocket 159 is a tubular shaft 163 having an internal diameter greater than the external diameter of main shaft 150 and being engaged to said latter at its upper and lower ends by needle bearings or the like 164, 165 so that shafts 150, 163 may rotate independently of each other. Disposed between bearing 165 and sprocket 159 is a thrust bearing 166. Carried upon said shaft 163 immediately above serving decks 7 and 8 are sprockets 167, 168 being maintained in operative position by a set screw or other conventional means; said sprockets being engaged to one end portion of endless conveyors 116, 117 respectively. Mounted upon the lower end of shaft 163 is another sprocket 169 for connection, as by means of a belt 170, to a gear reducer 171 which is operatively engaged to a prime mover 172 also mounted within housing 19.

Surrounding shaft 163 from a point immediately above serving deck 9 to a point just above sprocket 169, is a tubular shaft 173 having an inside diameter greater than the outside diameter of shaft 163 and being engaged upon the latter by means of needle bearings or the like 174, 175 at the upper and lower ends of said shaft 173. Disposed about shaft 163 between its lower end sprocket 169 and the lower end edge of shaft 173 is a thrust bearing 176. Engaged upon shaft 173 as by means of a set screw or other suitable means are sprockets 177 and 178, respectively, immediately above serving decks 9, 10 for engaging one end portion of endless conveyor chains 118, 119, respectively. At its lower end said shaft 173 mounts a drive sprocket 179 for engaging an endless drive belt 180 for connection to a gear reducer 181 which latter is in turn operated by a prime mover 182 also disposed within housing 19. Shaft 173 immediately below serving deck 10 has disposed thereabout a needle bearing 183 for journalling within a pillow block 184 fixed upon bracket 109. It will thus be seen that each of the shafts 150, 163, and 173 are shown as being operated by independent drive means.

With conveyor assembly C', in their opposite end portions, each of the chains 115, 116, 117, 118, 119 are engaged about sprockets 185, 186, 187, 188, 189 which are mounted as by needle, or ball bearings 190 upon a fixed shaft 191 axially parallel to main shaft 150; said sprockets being respectively located immediately above serving decks 6, 7, 8, 9, 10, respectively. At its upper and lower extremities, shaft 191 is transversely drilled for extension therethrough of elongated adjustment screws 192, 193, respectively, which are axially normal to said shaft 191 and project in a direction parallel to the longitudinal axis of oven A. At their ends adjacent the proximate end of oven A, each of said screws 192, 193 is fixed within a rigid mounting arm 194, 195 projecting rearwardly from the rearward faces of upper and lower beams 38, 23, respectively. Engaged upon each adjustment screw 192, 193, on either side of shaft 191, is a pair of nuts 196, 197 by manipulation of which shaft 191 may be moved longitudinally of the said screws 192, 193 for providing requisite adjustability to control the tension on the various conveyors. Thus, with assembly C', idler shaft 191 is of non-rotative character, with the various sprockets thereon being freely rotatable thereabout as distinguished from assembly C wherein the various sprockets rotate with idler shaft 126.

In view of the foregoing it will be seen that each of said shafts 150, 163, 173 may be rotated at a predetermined speed whereby the endless conveyors associated therewith can move at a prescribed rate. The novel arrangement of concentric shafts is merely illustrative of the potential for selectivity in convenyor speeds since any number of such shafts could be utilized. By means of this unique multiple conveyor assembly, the rates of travel through each oven chamber may be controlled and thereby provide the operator with another critical variable. Thus, for instance, the temperature of one oven chamber could be elevated and concurrently the rate of travel of the related conveyor could be accelerated, or, conversely, if a slower heating process is desired, the rate of travel could be reduced, etc. Thus, the versatility of the present invention is markedly enhanced by the feature of providing conveyor speed control for the individual oven chambers.

Figure 24:
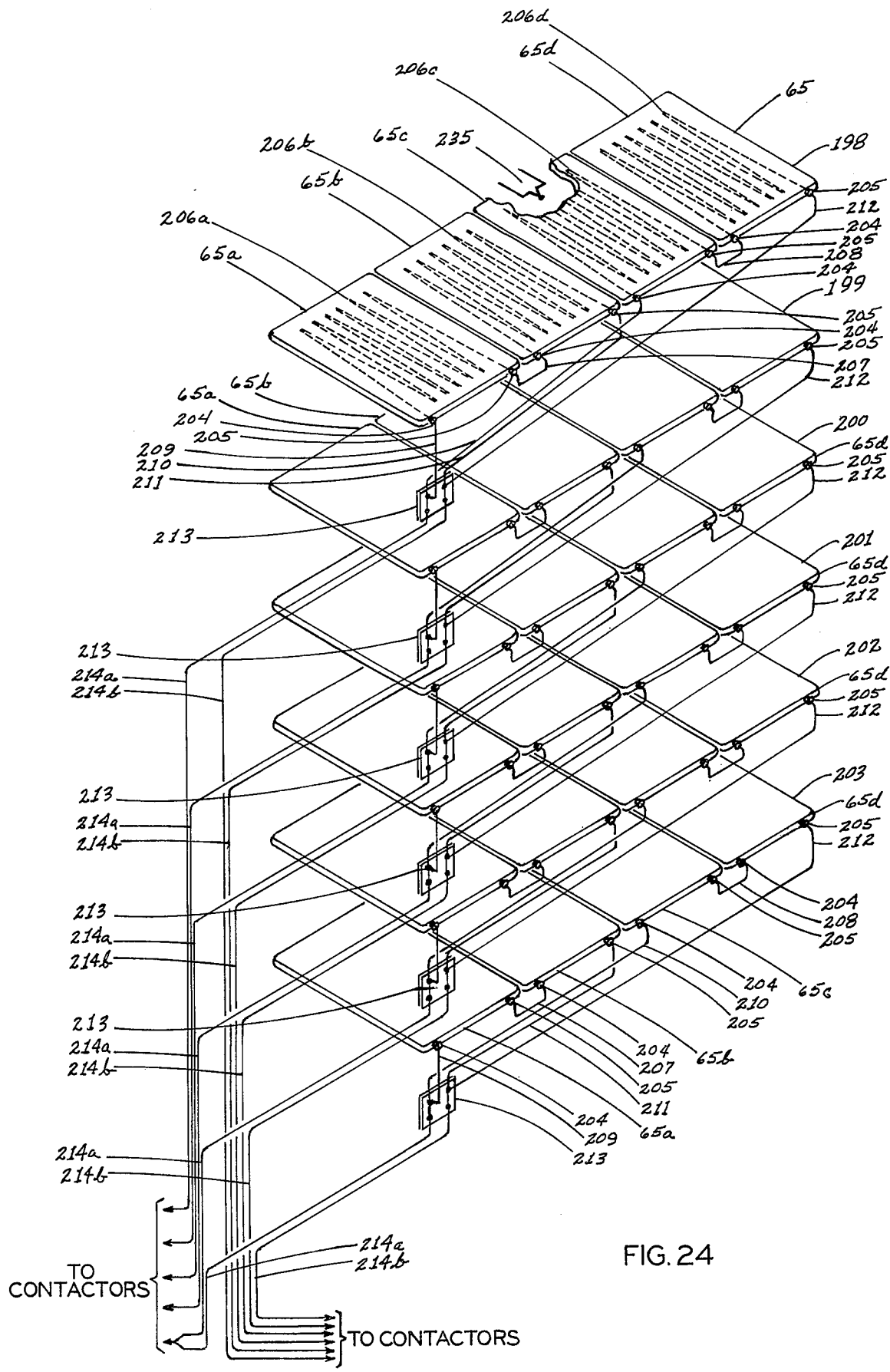
FIG. 24 is a perspective view of the arrangement of the heating panels and the wiring associated therewith.

Turning now to FIG. 24, the precise manner of connection of the four heating panels 65 in each of the six horizontal series of panels will now be described. For purposes of clarity the said series of panels will be identified by the numerals 198, 199, 200, 201, 202, 203 progressing from the uppermost to the lowermost. Thus, series 198 is located immediately beneath upper insulating panel 76, while series 199, 200, 201, and 203 are disposed immediately beneath the oven floors aligned with decks 6, 7, 8, 9 and 10, respectively. The four panels in each of the said series, for purposes of description will be referred to as 65a, 65b, 65c and 65d, and each of said panels contains the usual pair of terminals 204, 205 to the incorporated heating element, such as indicated at 206a, 206b, 206c, and 206d, respectively. Elements 206a and 206b of panels 65a and 65b are connected in series by means of a conductor 207 extending between terminal 205 of panel 65a and terminal 204 of panel 65b. Similarly, heating elements 206c and 206d of panels 65c and 65d, respectively, are connected in series by means of a conductor 208 between terminal 205 of panel 65c and terminal 204 of 65d. The two sets or pairs of serially connected panels 65a and 65b, 65c and 65d, are connected in parallel by means of leads 209, 210 and 211, 212 progressing from the respective terminals of the panels 65a, 65b and 65c, 65d to a terminal block 213.

Figures 25, 26, 27:
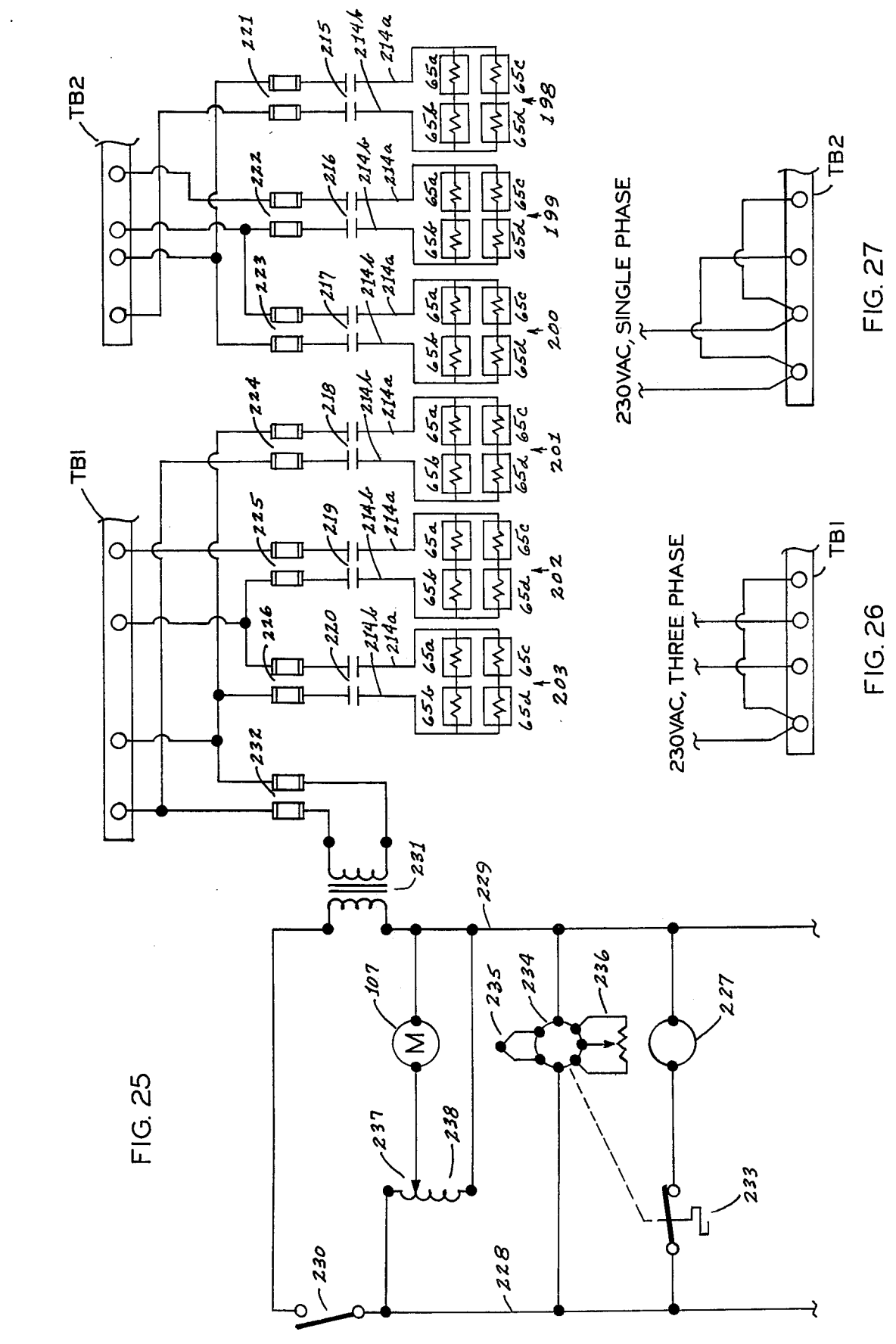

Corresponding conductors 214a and 214b run from terminal block 213 to individual power switching contacts of contactors. Referring to FIG. 25, these contacts are designated at 215, 216, 217, 218, 219 and 220, being respectively connected to panel series 198, 199, 200, 201, 202, and 203. Connectors 214a and 214b are but representative of the conductors for each series of panels and for purposes of simplicity will be described, but with like pertinency to the remaining panel series, said conductors are shown interconnecting the heating elements of panel series 198 with the associated contacts 215. It will be understood that the heating elements of the other series of panels are similarly shown interconnected in FIG. 25 with corresponding contactor contacts. A.C. power from either a single or three phase source, preferably at 230 volts, is supplied via terminal blocks TB1 and TB2 and through sets of fuses 221, 222, 223, 224, 225 and 226 to the contactor contacts 215, 216, 217, 218, 219, 220, respectively. The three-phase input connection is shown in FIG. 26, the single-phase input being shown in FIG. 27. Thus, when any pair of contacts, such as the set 215, closes, a.c. power will be supplied to the heating elements, such as those of the panel series 198.

Each set of contacts, such as 215, etc. is controlled by a respective contactor winding or coil, such as that shown at 227. A.C. power at a suitable voltage for energizing each such coil contactor is provided across leads 228 and 229 when a main control switch 230 is closed to connect said leads 228 and 229 across the secondary winding of a step-down transformer 231. The a.c. line voltage from terminal block TB1 is provided through a set of fuses 232 to the primary winding of transformer 231.

Connected in a series circuit with the contactor coil, as 227, across leads 228 and 229, is a set of thermally-operated contacts 233 of a thermocouple-input, solid state temperature control 234 of the time-proportioning type; that is, current for heating the thermally-operated contacts 233 is switched on and off during each cycle of the a.c. input voltage. According to the preferred embodiment, six series or banks of panels may be controlled by five thermocouple temperature controls of the type shown at 234 by permitting one such control to control energization of two contactor coils of the type shown at 217. Thus, it is preferred that the two lower panel series 202 and 203 to be controlled by a single temperature control. Only the single control 234 is shown in FIG. 25 for clarity but additional such controls will be understood to be connected across leads 228 and 229 in the same fashion.

A.C. power from leads 228 and 229 is shown provided to control 234 for operation thereof. A thermocouple 235 interconnected with control 234 senses the temperature of the particular panel series, a potentiometer 236 determining the temperature to be maintained. Each such thermocouple is preferably located a fraction of an inch below the surface of one of the heating panels, such as 65c as shown representatively in FIG. 24. For purposes of clarity, the several leads for each such thermocouple (there being one thermocouple for each of five series of panels) are now shown, but will be understood to be interconnected as shown in FIG. 25.

When a demand for heat is sensed via thermocouple 235 by control 234, contacts 233 close to energize the related contactor coil, as 217, and thereby close the associated set, as at 215, of contacts controlled by such coil in order to energize the heating element of the particular panel series, as 198, in this instance. In this way, each such series of panels is individually maintained at a predetermined temperature.

The prime mover or drive motor 107 is shown having one side being connected to lead 229, the other side being connected to the tap 237 of a variable autotransformer 238 whose winding is connected between leads 228 and 229. Thus, the setting of tap 237 determines the speed of the drive motor 107.

It is, of course, understood that in the event oven A incorporated conveyor assembly C', wherein there were a multiplicity of prime movers, such as 162, 172, 182, the electrical system could be readily modified for incorporating such prime movers without departing from the spirit of the present invention.

Figure 22:
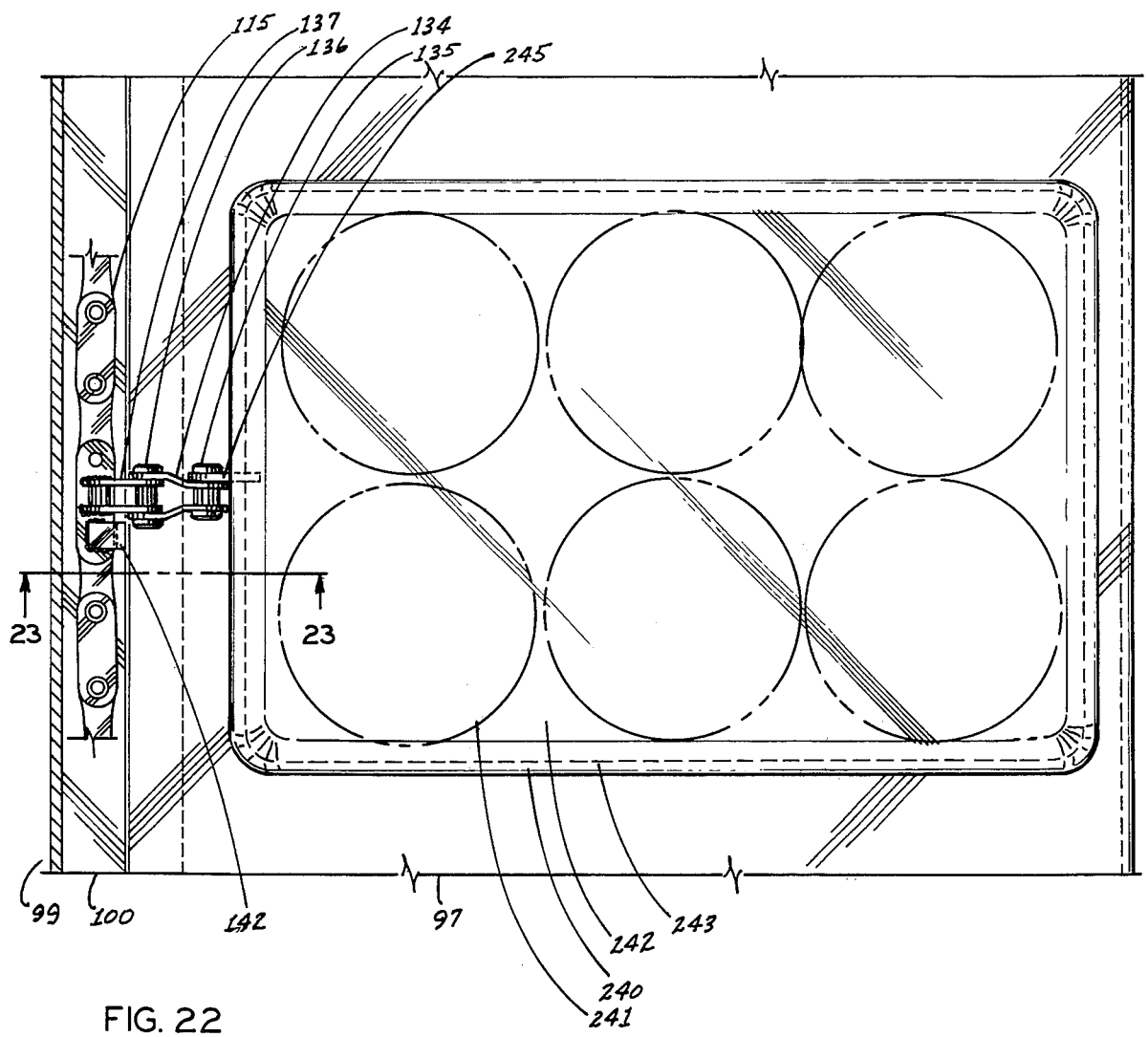
FIG. 22 is a top plan view taken substantially on the line 11—11 of FIG. 1, but illustrating another form of product transfer device.
Figure 23:
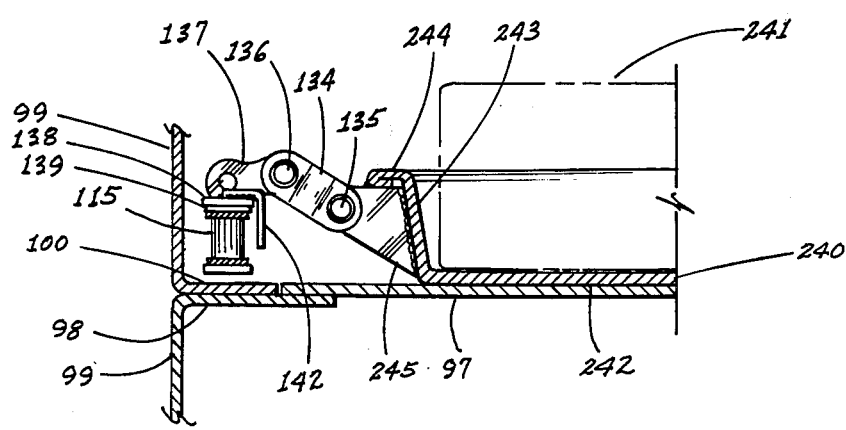
FIG. 23 is a vertical transverse sectional view taken on the line 23—23 of FIG. 22.

With reference now being made to FIGS. 22 and 23, it will be observed that the arcuate sweep arms 132 hereinabove described may, if desired, be replaced by a receptacle or container 240 for retaining either singly, or in multiple, articles to be heated such as indicated at 241. Thus, receptacle 240 provides a self-contained means for transporting the articles to be treated with direct connection to the particular conveyor chain, such as for example, 115, as opposed to the directing of an article or a container for such article by sweep arms 132. The container 240, which is merely exemplary of any innumerable containers which may be used, is of the open top type having a bottom wall 242, and a peripheral side wall 243 which may have an out-turned flange 244 at its upper end. Affixed, as by welding or the like, to side wall 243 in its portion confronting the related conveyor chain, such as 115, is a bracket 245 which corresponds substantially to bracket 133 engaged upon sweep arm 132 and with the connectable means therebetween to the particular conveyor chain being the same so that like parts will bear like reference numerals.

Having described my invention what I claim and desire to obtain by Letters Patent is:

1. A multiple tier oven comprising of framework, means defining a plurality of superimposed oven chambers mounted on said framework in registering relationship, each of said oven chambers having a floor, means defining an oven-serving deck associated with each oven externally thereof, means maintaining said serving decks in vertically spaced apart relationship, each of said oven chambers being of tunnel form having an ingress at one end and an egress at the opposite end, the related oven-serving deck having first and second end portions adjacent to, and extending respectively from, the ingress and egress of the associated oven chamber in continuity with the tunnel floor thereof, said oven-serving decks each having at least one lateral section disposed adjacent one side of said oven chamber and extending between the associated first and second end portions, an endless conveyor associated with each oven chamber and having an inner course and an outer course within a plane parallel to the plane of the related oven-serving deck, said inner course presented interiorly of the related oven chamber above the floor thereof, said outer course presented exteriorly of the associated oven chamber above the related deck lateral section, means effecting travel of said endless conveyors, and means heating said oven chambers.

2. A multiple tier oven as defined in claim 1 and further characterized by the floor of each oven chamber being co-planar with the deck associated therewith.

3. A multiple tier oven as defined in claim 1 and further characterized by means detachably engaged on said endless conveyors for moving work to be heated through the associated oven chamber and along the related serving deck.

4. A multiple tier oven as defined in claim 3 and further characterized by said detachably engaged means being a sweep arm.

5. A multiple tier oven as defined in claim 3 and further characterized by said detachably engaged means being a work-containing receptacle.

6. A multiple tier oven as defined in claim 1 and further characterized by said means for heating said ovens being heating means provided in each oven chamber, and independently controlled means connected to each oven chamber heating means whereby the temperature within each oven chamber may be independently controlled.

7. A multiple tier oven as defined in claim 6 and further characterized by the heating means in each oven chamber comprising a plurality of planar aligned infrared emitter panels, and means for mounting said panels within the upper portion of each oven chamber spacedly above the floor of such chamber and immediately below the floor of the overlying oven chamber.

8. A multiple tier oven as defined in clam 1 and further characterized by heating means provided in each oven chamber, and independently controlled means connected to each heating means whereby the temperature within each oven chamber may be independently controlled.

9. A multiple tier oven comprising of framework, means defining a plurality of superimposed oven chambers mounted on said framework in registering relationship, each of said oven chambers having a floor, means defining an oven-serving deck associated with each oven chamber externally thereof, each of said oven chambers being of tunnel form having an ingress at one end and an egress at the opposite end, each of the related oven-serving decks having end portions adjacent the related oven chamber ingress and egress and at least one lateral section connecting said end portions along a side of the related oven chamber, endless conveyors associated with each oven chamber and its related serving deck for travel into, through, and from, such oven chamber, said oven serving decks having first and second registering openings, said first openings being proximate but outwardly spaced from the related oven chamber egress and said second openings being proximate but outwardly of, and spaced from, the ingress of the associated oven chamber, a drive shaft extending through said first deck openings, an idler shaft extending through said second deck openings, means mounting said endless conveyors upon said drive and idler shafts in vertically spaced apart relationship whereby each endless conveyor is presented in immediately spaced above relationship to the related oven serving deck, and means for driving said main shaft to cause travel of said endless conveyors.

10. A multiple tier oven as defined in claim 9 and further characterized by each endless conveyor having an inner course for travel through the related oven chamber and an outer course for movement along the related serving deck outwardly of the associated oven chamber.

11. A multiple tier oven as defined in claim 10 and further characterized by a predetermined number of sweep arms detachably carried upon each endless conveyor for propelling material into, through, and from the related oven chamber.

12. A multiple tier oven as defined in claim 11 and further characterized by each sweep arm being of arcuate configuration.

13. A multiple tier oven as defined in claim 10 and further characterized by a predetermined number of article containers being detachably carried in spaced relationship upon each conveyor for delivering articles into, through, and from the related oven chamber.

14. A multiple tier oven comprising of framework, means defining a plurality of superimposed oven chambers mounted on said framework in registering relationship, each of said oven chambers having a floor, means defining an overserving deck associated with each oven chamber externally thereof and being planarwise aligned with the floor of such related oven chamber, means maintaining said serving decks in vertically spaced apart relationship, heating means provided in each oven chamber, independently control means connected to each heating means whereby the temperature within each oven chamber may be independently controlled, said floor of each oven chamber being comprised of heat transferable glass.

15. A multiple tier oven as defined in claim 14 and further characterized by the heating means in each oven consisting of a plurality of planar aligned infrared emitter panels, and means for mounting said heating panels within the upper portion of each oven chamber spacedly above the floor of such chamber and immediately below the floor of the overlying chamber.

16. A multiple tier oven as defined in claim 15 and further characterized by said oven chambers having a plurality of common detachable insulated closure panels whereby the removal of the same permit of facile access to the interior of said chambers.

17. A multiple tier oven as defined in claim 15 and further characterized by a thermocouple provided downwardly of each infrared emitter panel, circuit means connecting said thermocouples and means for predetermining the temperature within any oven chamber.

18. A multiple tier oven as defined in claim 16 and further characterized by said closure panels incorporating exhaust-forming passages.

19. A multiple tier oven as defined in claim 15 and further characterized by there being a series of four planar aligned infrared emitter panels within each oven chamber, said series being arranged in two pairs with the panels of each pair being connected in series and with each pair being connected in parallel, and circuit means connecting each series of heating panels, and a temperature control engaged within such circuit.

20. A multiple tier oven comprising of framework, means defining a plurality of superimposed oven chambers mounted on said framework in registering relationship, each of said ovens having a floor, means defining an oven-serving deck associated with each oven chamber externally thereof and being planarwise aligned with the floor of such related oven chamber, means maintaning said serving decks in vertically spaced apart relationship, each of said oven chambers being of tunnel character having an ingress at one end and an egress at the opposite end thereof, each of said oven serving decks having first and second sections respectively adjacent to, and endwise of, the ingress and the egress of the related oven chamber, and a central deck portion interconnecting the first and second end sections of the related deck and extending along one side of said related oven chamber.

21. A multiple tier oven as defined in claim 20 and further characterized by said framework comprising spaced-apart arms underlying the said deck central portions and cooperative interengaging means provided upon each deck central portion and the underlying framework arms for facile detachment and removal of said central deck portions.

22. A multiple tier oven as defined in claim 21 and further characterized by said interengaging means comprising pins mounted on said arms, said deck central portions having opposed depending flanges, there being upwardly opening recesses within said flanges for acceptance of said pins when said deck central portions are in operative position.

23. A multiple tier oven comprising a framework, means defining a plurality of superimposed oven chambers mounted on said framework in registering relationship, each of said oven chambers having a floor, means defining an oven-serving deck associated with each oven chamber externally thereof, means maintaining said serving decks in vertically spaced apart relationship, each of said oven chambers being of tunnel form having an ingress at one end and an egress at the opposite end thereof, the related oven-serving decks having end portions adjacent the ingress and egress of the related oven chamber and at least one lateral section connecting said end portions along a side of the related oven chamber, said oven serving decks having first and second registering openings, said first opening of each deck being proximate but outwardly spaced from the related oven chamber egress, said second opening of each related oven serving deck being proximate but outwardly of, and spaced from, the ingress of the related oven chamber, a main shaft extending upwardly through said first deck openings, at least one drive shaft presented externally of said main shaft, said at least one drive shaft being of less length than said main shaft, means effecting independent rotation of said main shaft and said at least one drive shaft, an idler shaft extending vertically through said second deck openings, a plurality of endless conveyors, means mounting selected ones of said endless conveyors in one of their end portions upon said drive shaft and in their other end portions about said idler shaft, means mounting others of said endless conveyors in one of their end portions upon said at least one drive shaft and in their other end portions about said idler shaft, said endless conveyors being presented in vertically spaced apart relationship immediately above the related serving deck and adapted for travel in a plane parallel to such serving deck.

* * * * *